United States Patent
Kawai et al.

(10) Patent No.: US 11,403,458 B2
(45) Date of Patent: Aug. 2, 2022

(54) INFORMATION PROCESSING SYSTEM, INFORMATION PROCESSING DEVICE, INFORMATION PROCESSING METHOD, RECORDING MEDIUM, AND PROGRAM

(71) Applicant: Rakuten Group, Inc., Tokyo (JP)

(72) Inventors: Eriko Kawai, Tokyo (JP); Kazuki Onishi, Tokyo (JP)

(73) Assignee: Rakuten Croup, Inc., Tokyo (JP)

( * ) Notice: Subject to any disclaimer, the term of this patent is extended or adjusted under 35 U.S.C. 154(b) by 700 days.

(21) Appl. No.: 14/917,325

(22) PCT Filed: Nov. 14, 2013

(86) PCT No.: PCT/JP2013/080821
§ 371 (c)(1),
(2) Date: Mar. 8, 2016

(87) PCT Pub. No.: WO2015/071997
PCT Pub. Date: May 21, 2015

(65) Prior Publication Data
US 2016/0224529 A1   Aug. 4, 2016

(51) Int. Cl.
*G06Q 30/06* (2012.01)
*G06F 40/174* (2020.01)

(52) U.S. Cl.
CPC .......... *G06F 40/174* (2020.01); *G06Q 30/06* (2013.01); *G06Q 30/0633* (2013.01)

(58) Field of Classification Search
CPC ...................................... G06Q 30/0601–0645
(Continued)

(56) References Cited

U.S. PATENT DOCUMENTS 7,346,652 B2 * 3/2008 Berrigan ............... G06F 17/243
707/999.01
8,380,710 B1 * 2/2013 Finne ................ G06F 16/24578
707/723
(Continued)

FOREIGN PATENT DOCUMENTS

JP    2002-073234 A    3/2002
JP    2004-290525 A    10/2004
(Continued)

OTHER PUBLICATIONS

Scaffidi, Christopher, Brad Myers, and Mary Shaw. "Tool support for data validation by end-user programmers." 2008 ACM/IEEE 30th International Conference on Software Engineering. IEEE, 2008.*

(Continued)

*Primary Examiner* — Michelle T Kringen
(74) *Attorney, Agent, or Firm* — Sughrue Mion, PLLC

(57) ABSTRACT

In an information processing system 1, a display controlling unit 2 displays, on a terminal device, a first form containing fields. An accepting unit 3 accepts, from a user, an entry in the fields contained in the first form. A determining unit 4 determines whether or not each of the entered fields contained in the first form satisfies a determination condition that is associated in advance with each field. When there is an unsatisfied field that fails to satisfy the determination condition among the entered fields contained in the first form, the display controlling unit 2 displays a second form that gives a higher priority to the unsatisfied field and lays out the unsatisfied field above a satisfied field satisfying the determination condition among the entered fields contained in the first form, and, the accepting unit accepts, from the user, an entry in the fields that is contained in the second form.

15 Claims, 22 Drawing Sheets

(58) Field of Classification Search
USPC .................................................. 705/26.1–27.2
See application file for complete search history.

(56) References Cited

U.S. PATENT DOCUMENTS

| | | | | |
|---|---|---|---|---|
| 2002/0047859 | A1* | 4/2002 | Szlam | G06F 16/957 715/705 |
| 2004/0243520 | A1* | 12/2004 | Bishop | G07F 7/1008 705/75 |
| 2005/0261558 | A1* | 11/2005 | Eaton | G16H 20/10 600/300 |
| 2006/0271885 | A1* | 11/2006 | Pittendrigh | G06F 16/248 715/856 |
| 2010/0153544 | A1* | 6/2010 | Krassner | G06F 16/9577 709/224 |
| 2011/0314376 | A1* | 12/2011 | Dearman | G06F 9/453 715/711 |
| 2013/0238972 | A1* | 9/2013 | Woodman | G06F 16/95 715/234 |
| 2014/0279484 | A1* | 9/2014 | Dwyer | G06Q 20/108 705/42 |
| 2015/0379014 | A1* | 12/2015 | Xu | G06F 16/957 707/711 |

FOREIGN PATENT DOCUMENTS

| | | |
|---|---|---|
| JP | 2006-031582 A | 2/2006 |
| JP | 2008-070992 A | 3/2008 |
| JP | 2009-104229 A | 5/2009 |

OTHER PUBLICATIONS

IP.com Prior Art Database Technical Disclosure, "Displaying a Subset of a Plurality of Field to a User," Jun. 25, 2012. https://ip.com/IPCOM/000219175 (Year: 2012).*

International Search Report of PCT/JP2013/080821 dated Jan. 28, 2014 [PCT/ISA/210].

\* cited by examiner

| USER ID | PASSWORD | E-MAIL ADDRESS | LAST NAME | FIRST NAME |
|---|---|---|---|---|
| TARO123 | ******** | aaa@bbb | SUZUKI | TARO |
| ... | ... | ... | ... | ... |

| USER ID | PASSWORD | E-MAIL ADDRESS | LAST NAME | FIRST NAME | ADDRESS | ... |
|---|---|---|---|---|---|---|
| XYZ | ****** | xxx@yyy | YAMADA | HANAKO | ... | ... |
| ... | ... | ... | ... | ... | ... | ... |

INFORMATION PROCESSING SYSTEM, INFORMATION PROCESSING DEVICE, INFORMATION PROCESSING METHOD, RECORDING MEDIUM, AND PROGRAM

CROSS REFERENCE TO RELATED APPLICATIONS

This application is a National Stage of International Application No. PCT/JP2013/080821, filed Nov. 14, 2013, the contents of which are incorporated herein by reference in its entirety.

TECHNICAL FIELD

The present disclosure relates to an information processing system, an information processing device, an information processing method, a recording medium, and a program suitable for presenting, to a user, an item that is to direct the user's attention in an easy-to-understand manner when the user enters in multiple items.

BACKGROUND ART

Conventionally, a system is known which connects a server and a terminal via a communication network, stores, in the server, data that is entered by a user using the terminal, and aggregates or processes the data stored in the server. For example, Patent Literature 1 discloses a medical diagnosis assisting system that enables, when a person subjected to a medical diagnosis answers questions prepared in advance through a terminal, a person in charge to remotely view the answers through a communication network.

A technology is also known which assists a user's enter. For example, Patent Literature 2 discloses an apparatus which displays a popped-up image (a hint) describing information associated with a button when a user puts the cursor of a mouse on the button and performs a left click, and displays a menu that can store or eliminate the popped-up and displayed image when the user puts the mouse cursor on a button and performs a right click.

CITATION LIST

Patent Literature

Patent Literature 1: Unexamined Japanese Patent Application Kokai Publication No. 2004-290525
Patent Literature 2: Unexamined Japanese Patent Application Kokai Publication No. 2002-073234

SUMMARY OF INVENTION

Technical Problem

There is a problem that the enter work by the user becomes a time-consuming work, and thus the user may forget to enter or make a mistake when there are multiple items to be entered by the user. In addition, there is a problem with difficulty in reviewing which item to take another look when the user forgets to enter or makes a mistake.

The present disclosure has been made in view of the aforementioned circumstances, and an objective of the present disclosure is to provide an information processing system, an information processing device, an information processing method, a recording medium, and a program suitable for presenting, to a user, an item that is to direct the user's attention in an easy-to-understand manner when the user enters in multiple items.

Solution to Problem

In accordance with a first aspect of the present disclosure, there is provided an information processing system including:

a display controlling unit that displays, on a terminal device, a first form containing a plurality of fields;

an accepting unit that accepts, from a user, an entry in the plurality of fields contained in the first form; and a determining unit that determines whether or not each of the plurality of entered fields contained in the first form satisfies a determination condition that is associated in advance with each of the plurality of fields, wherein when there is an unsatisfied field that fails to satisfy the determination condition among the plurality of entered fields contained in the first form, the display controlling unit displays, on the terminal device, a second form that gives a higher priority to the unsatisfied field and lays out the unsatisfied field above a satisfied field satisfying the determination condition among the plurality of entered fields contained in the first form, and, the accepting unit accepts, from the user, an entry in the plurality of fields contained in the second form.

The display controlling unit may lay out and display the unsatisfied field at a layer above the satisfied field in the second form.

The determining unit may determine that, for each of the plurality of fields, the field satisfies the determination condition when information is entered in the field by the user, and may determine that the field fails to satisfy the determination condition when the information is not entered in the field by the user.

The information processing system may provide, to the user, an electronic commerce service for accepting, from the user, an instruction to purchase a product.

The first form may contain a plurality of pieces of product information each associating a field indicating the product purchased by the user with a field indicating the number of products purchased by the user.

The determining unit may determine that a field corresponding to a product with the number of products that is one satisfies the determination condition, and may determine that a field corresponding to a product with the number of products that is not one fails to satisfy the determination condition.

The display controlling unit may display the unsatisfied field in a relatively emphasized manner above the satisfied field in the second form.

In accordance with another aspect of the present disclosure, there is provided an information processing system including:

an obtaining unit that obtains, in accordance with a request containing user identification information from a terminal device, a user attribute stored in advance in association with the user identification information contained in the request;

an inputting unit to enter the obtained user attribute in a field corresponding to the obtained user attribute among a plurality of fields contained in a first form;

a determining unit that determines whether or not each of the plurality of entered fields contained in the first form satisfies a determination condition that is associated in advance with each of the plurality of fields;

a display controlling unit that displays, on the terminal device when there is an unsatisfied field that fails to satisfy the determination condition among the plurality of entered fields contained in the first form, a second form that gives a higher priority to the unsatisfied field and lays out the unsatisfied field above a satisfied field satisfying the determination condition among the plurality of entered fields contained in the first form; and an accepting unit that accepts, from the user, an entry in the plurality of fields contained in the second form.

The display controlling unit may display the obtained user attribute in the field that satisfies the determination condition among the plurality of fields contained in the second form, and may set the field that fails to satisfy the determination condition among the plurality of fields contained in the second form to be blank and display the blank field.

In accordance with yet another aspect of the present disclosure, there is provided an information processing method including:

a display controlling step for displaying, on a terminal device, a first form containing a plurality of fields;

an accepting step for accepting, from a user, an entry in the plurality of fields contained in the first form; and a determining step for determining whether or not each of the plurality of entered fields contained in the first form satisfies a determination condition that is associated in advance with each of the plurality of fields, wherein when, in the step for displaying, there is an unsatisfied field that fails to satisfy the determination condition among the plurality of entered fields contained in the first form, a second form is displayed on the terminal device, the second form giving a higher priority to the unsatisfied field and laying out the unsatisfied field above a satisfied field satisfying the determination condition among the plurality of entered fields contained in the first form, and, in the accepting step, an entry in the plurality of fields contained in the second form is accepted from the user.

In accordance with yet another aspect of the present disclosure, there is provided a recording medium having stored therein a program for causing a computer to function as:

a display controlling unit that displays, on a terminal device, a first form containing a plurality of fields;

an accepting unit that accepts, from a user, an entry in the plurality of fields contained in the first form; and a determining unit that determines whether or not each of the plurality of entered fields contained in the first form satisfies a determination condition that is associated in advance with each of the plurality of fields, wherein when there is an unsatisfied field that fails to satisfy the determination condition among the plurality of entered fields contained in the first form, the display controlling unit displays, on the terminal device, a second form that gives a higher priority to the unsatisfied field and lays out the unsatisfied field above a satisfied field satisfying the determination condition among the plurality of entered fields contained in the first form, and, the accepting unit accepts, from the user, an entry in the plurality of fields contained in the second form.

In accordance with yet another aspect of the present disclosure, there is provided a program that causes a computer to function as:

a display controlling unit that displays, on a terminal device, a first form containing a plurality of fields;

an accepting unit that accepts, from a user, an entry in the plurality of fields contained in the first form; and a determining unit that determines whether or not each of the plurality of entered fields contained in the first form satisfies a determination condition that is associated in advance with each of the plurality of fields, wherein when there is an unsatisfied field that fails to satisfy the determination condition among the plurality of entered fields contained in the first form, the display controlling unit displays, on the terminal device, a second form that gives a higher priority to the unsatisfied field and lays out the unsatisfied field above a satisfied field satisfying the determination condition among the plurality of entered fields contained in the first form, and, the accepting unit accepts, from the user, an entry in the plurality of fields contained in the second form.

The aforementioned program can be distributed and sold over a computer communication network, separately from a computer on which the program is executed. The aforementioned non-transitory recording medium may be a non-transitory recording medium, and can be distributed and sold separately from the computer.

Advantageous Effects of Invention

According to the present disclosure, there are provided the information processing system, the information processing device, the information processing method, the recording medium, and the program suitable for presenting, to the user, the item that is to direct the user's attention in an easy-to-understand manner when the user enters in multiple items.

DESCRIPTION OF EMBODIMENTS

Embodiments of the present disclosure will now be described. It should be noted that the following embodiments are meant only to be illustrative and are not intended to limit the scope of the present disclosure. Accordingly, it will be apparent to those skilled in the art that various equivalent and alternative embodiments, in whole or in part, are possible, and the present disclosure also covers all of these embodiments.

First Embodiment

Figure 1:
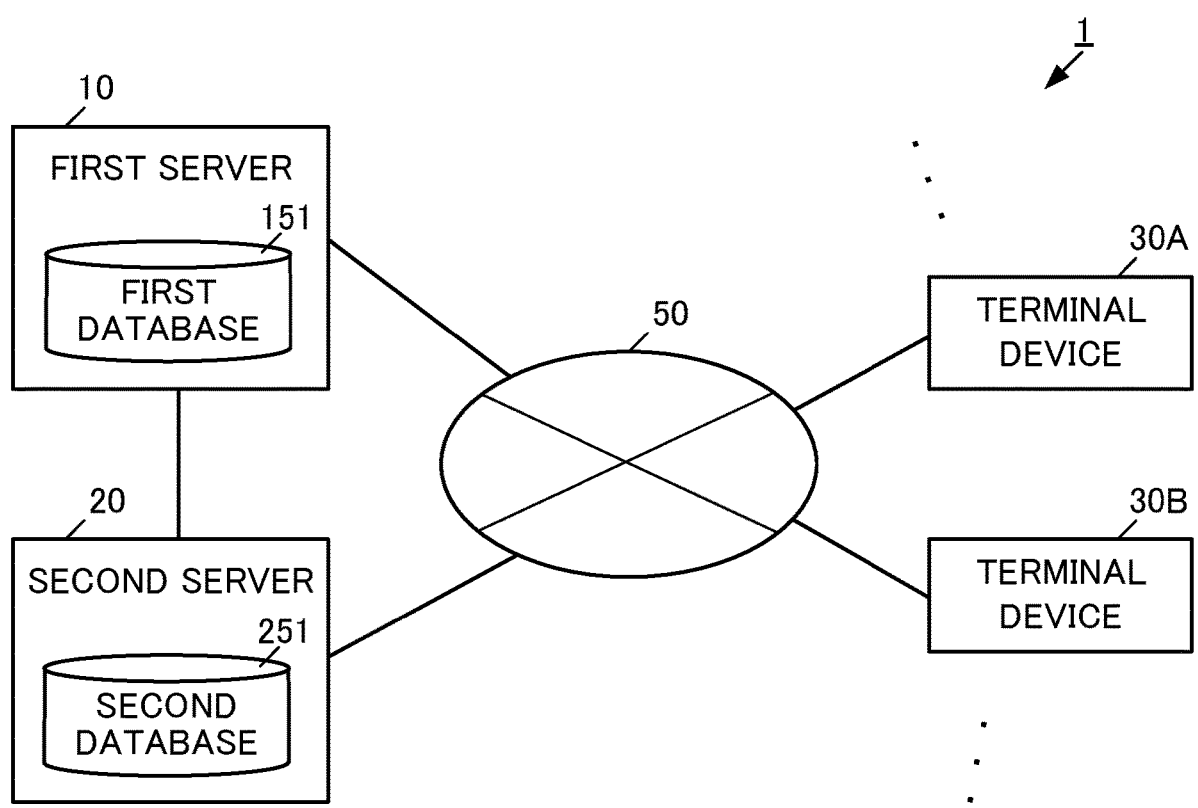
FIG. 1 is a diagram illustrating a general structure of an information processing system.

FIG. 1 illustrates a general structure of an information processing system 1 according to this embodiment. The information processing system 1 includes a first server 10, a second server 20, a terminal device 30 (in FIG. 1, two devices 30A and 30B), and a communication network 50.

The first server 10 is a server that provides, to a user, a first service in the information processing system 1. In this embodiment, the first service is an electronic commerce service for providing, to the user, an electronic shopping mall that sells a product or a service (hereinafter, collectively and simply referred to as a "product") over the Internet. A plurality of stores are available in the electronic shopping mall, and various products are sold by the stores.

The terminal device 30 requests, to the first server 10 based on a user's enter, a transmission of product data containing a feature of a product, a price of the product, an image of the product, and the like. In addition, the terminal device 30 transmits, to the first server 10 based on the user's entry, an instruction to purchase the product.

The first server 10 transmits, to the terminal device 30, the product data in response to the request made by the terminal device 30. In addition, the first server 30 accepts, when receiving the instruction to purchase the product from the terminal device 30, an order, notifies a store selling the product of the order details, and executes a payment process for the purchase.

The first server 10 includes a first database 151 that stores user information representing user attributes, such as a name of a user who receives the first service. Details of the first database 151 will be discussed later.

The second server 20 is a server that provides a second service to the user in the information processing system 1. In this embodiment, the second service is a financial service associated with a credit card. The second server 20 accepts the issuance of a credit card, displays a billing statement, accepts a change in the payment method, and so forth.

The terminal device 30 transmits, to the first server 10 based on the user's entry, for example, a request for credit card issue, a request for displaying the billing statement on the terminal device 30, a request for changing the payment method.

The second server 20 includes a second database 251 that stores user information representing user attributes, such as a name of the user who receives the second service. Details of the second database 251 will be discussed later.

Some of the items of the user information stored in the second database 251 are common to those of the user information stored in the first database 151, while other items are different.

The user information stored in the first database 151 can be provided to not only the first server 10 but also the second server 20. Similarly, the user information stored in the second database 251 can be provided to not only the second server 20 but also the first server 10.

In this embodiment, the first service and the second service are provided by the same business entity, or by different business belonging to the same corporate group. However, the first service and the second service may be provided by respective business entities of different corporate groups. In addition, the first service and the second service are not limited to the electronic shopping mall and the credit card services, and are optional, and, for example, may be the services associated with banking, corporate securities, life insurances, property insurances, and electronic money.

In this embodiment, the communication network is the Internet. However, the communication network 50 may be a LAN (Local Area Network), a WAN (Wide Area Network), a special-purpose line, and the like.

Figures 2A, 2B:
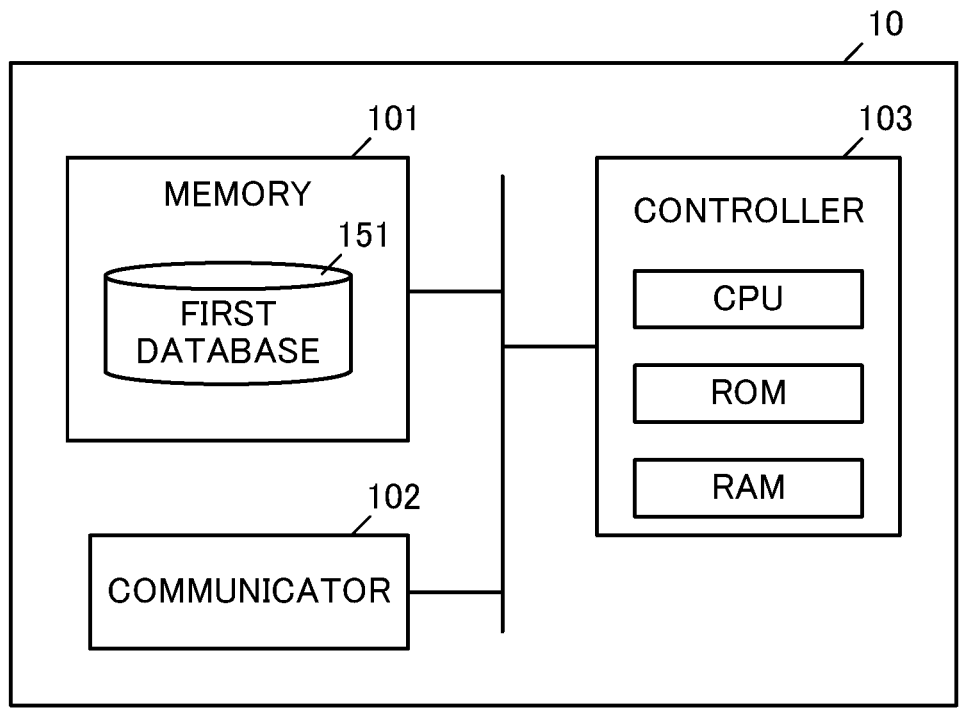
FIG. 2A is a diagram illustrating a structure of a first server.
FIG. 2B is a diagram illustrating a structure of data stored in a first database.

FIG. 2A illustrates a structure of the first server 10. The first server 10 includes a memory 101, a communicator 102, and a controller 103.

The memory 101 includes a memory device, such as a hard disk drive, and stores the first database 151. The first database 151 stores the user information representing the user attributes of the user who utilizes the first service (in this embodiment, the electronic shopping mall).

FIG. 2B illustrates a structure of the user information stored in the first database 151. The first database 151 stores, in association with a user ID that identifies the user, a password created by the user, an e-mail address specified by the user, and user's last name and first name. The user can freely change the user information stored in the first database 151 through the terminal device 30.

The user information stored in the first database 151 may contain other optional items in addition to the items illustrated in FIG. 2B, or instead of each item illustrated in FIG. 2B.

Further, the memory 101 stores the product data in advance for each product put on the electronic shopping mall.

The communicator 102 includes a NIC (Network Interface Card), connects the first server 10 with the communication network 50, and communicates with the terminal device 30.

The controller 103 includes a CPU (Central Processing Unit), a ROM (Read-Only Memory), a RAM (Random Access Memory), and the like, and controls the whole first server 10. When, for example, a transmission of product data is requested by the terminal device 30, the controller 103 obtains the product data stored in the memory 101, and transmits the obtained data to the terminal device 30.

An example first server 10 applicable is a typical computer server, a mainframe, a cloud server, or the like.

Figures 3A, 3B:
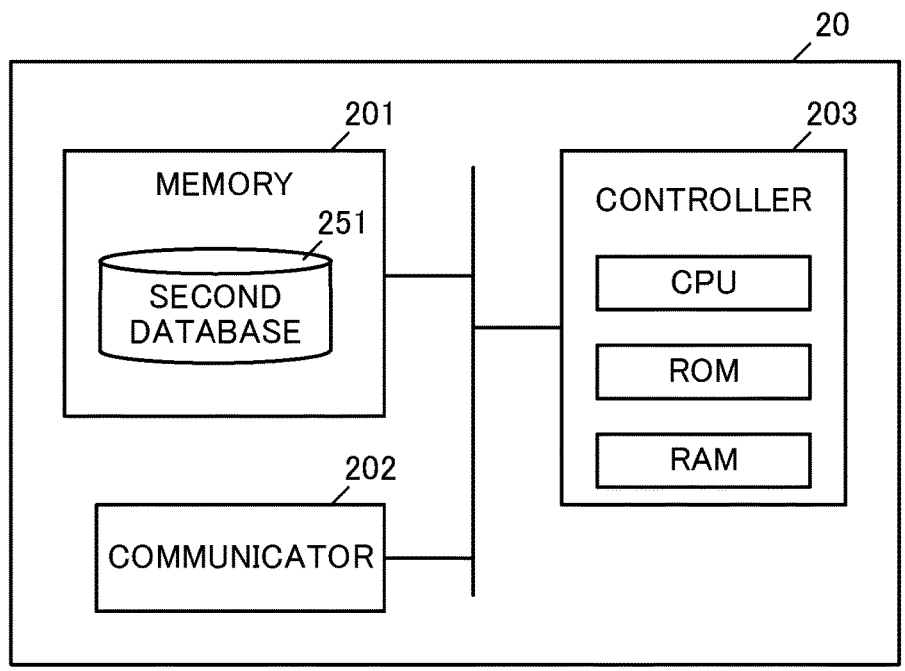
FIG. 3A is a diagram illustrating a structure of a second server.
FIG. 3B is a diagram illustrating a structure of data stored in a second database.

FIG. 3A illustrates a structure of the second server 20. The second server 20 includes a memory 201, a communicator 202, and a controller 203.

The memory 201 includes a memory device, such as a hard disk drive, and stores the second database 251. The second database 251 stores the user information representing the user attributes of the user who utilizes the second service (in this embodiment, a credit transaction with the credit card).

FIG. 3B illustrates a structure of the user information stored in the second database 251. The second database 251 stores, in association with the user ID that identifies the user, a password created by the user, an e-mail address specified by the user, a user last name and a first name, and user's mailing address. The user can freely change the user information stored in the second database 251 through the terminal device 30.

Although the structure of the user information illustrated in FIG. 2B is similar to the structure of the user information illustrated in FIG. 3B, no address is contained in the user information illustrated in FIG. 2B. The user information stored in the second database 251 and the user information stored in the first database 151 have common items, while there are uncommon items.

The user information stored in the second database 251 may contain other optional items in addition to the items illustrated in FIG. 3B, or instead of the items illustrated in FIG. 3B.

Furthermore, the memory 201 stores, user by user, personal history data, such as a credit card transaction history, and a payment method.

The communicator 202 includes an NIC, connects the second server 20 with the communication network 50, and communicates with the terminal device 30.

The controller 203 includes a CPU, a ROM, a RAM, and the like, and controls the whole second server 20. When, for example, a transmission of the credit card transaction history is requested by the terminal device 30, the controller 203 obtains the personal history data stored in the memory 201, and transmits the obtained data to the terminal device 30.

An example second server 20 applicable is a typical computer server, a mainframe, a cloud server, or the like.

Figure 4:
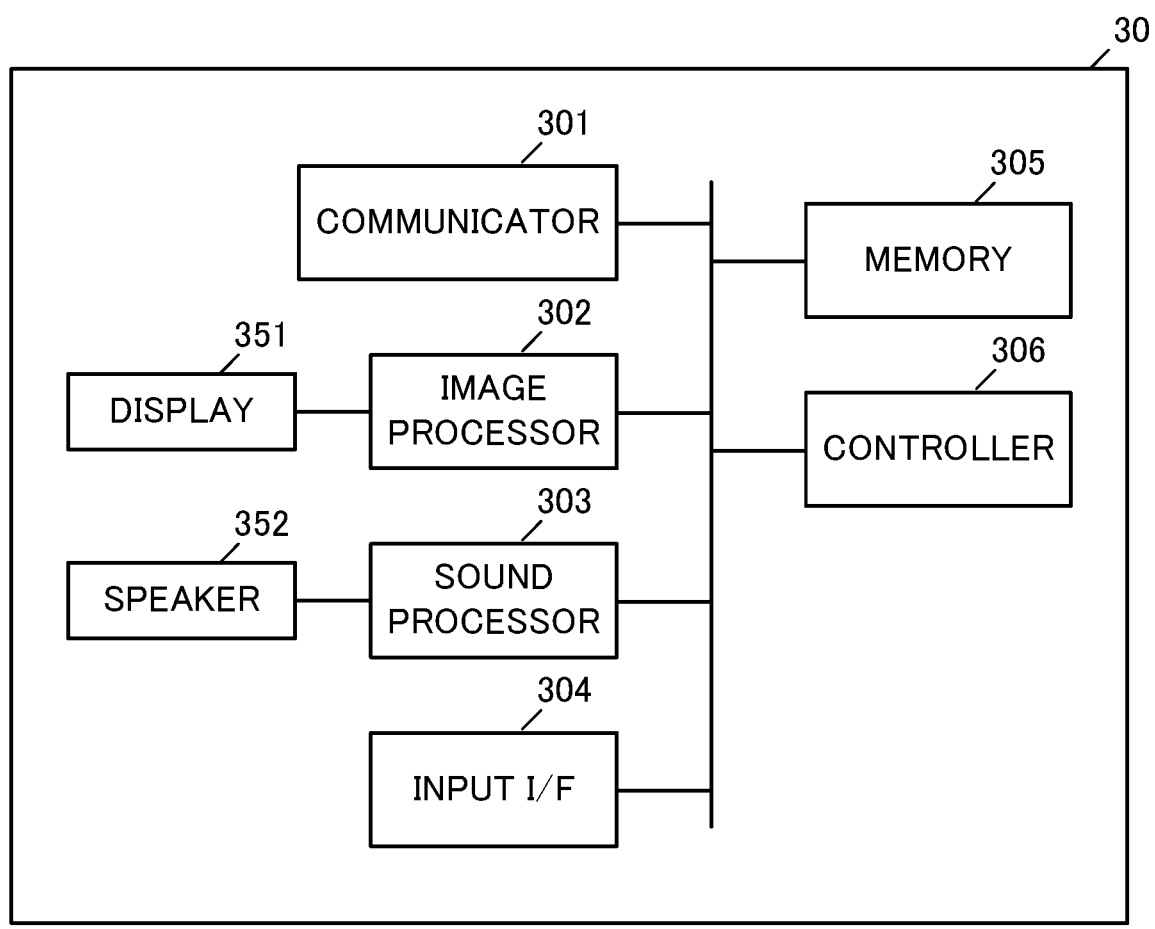
FIG. 4 is a diagram illustrating a structure of a terminal device.

FIG. 4 illustrates a structure of the terminal device 30. The terminal device 30 includes, a communicator 301, an image processor 302, a sound processor 303, an input interface (I/F) 304, a memory 305, and a controller 306.

The communicator 301 includes an NIC, connects the terminal device 30 with the communication network 50, and communicates with the first server 10 and with the second server 20.

The image processor 302 generates an image relevant to the first service and an image relevant to the second service, and displays the generated images on a display 351. For example, the image processor 301 receives, from the first server 10, the product data of the product for sale in the store, and displays the product's information on the display 351. In addition, the image processor 301 receives, for example, the credit card transaction history from the second server 20 and displays the credit card transaction history on the display 351.

The sound processor 303 outputs sounds from a speaker 352.

The input I/F 304 includes a keyboard and a mouse, and accepts an instruction given by the user. The input I/F 304 may include a touch panel 353. The touch panel 353 is disposed in a manner superimposed on the display 351.

The memory 305 includes a memory device, such as a hard disk, and stores an operating system for controlling the terminal device 30, various programs, image data, sound data, text data, and the like.

The controller 306 includes a CPU, and controls the whole terminal device 30. The controller 306 provides, to the user, the first service or the second service based on the instruction accepted through the input I/F 304.

An example terminal device 30 applicable is a personal computer, a multifunction mobile phone (a so-called smartphone), a tablet computer, or the like.

Figure 5:
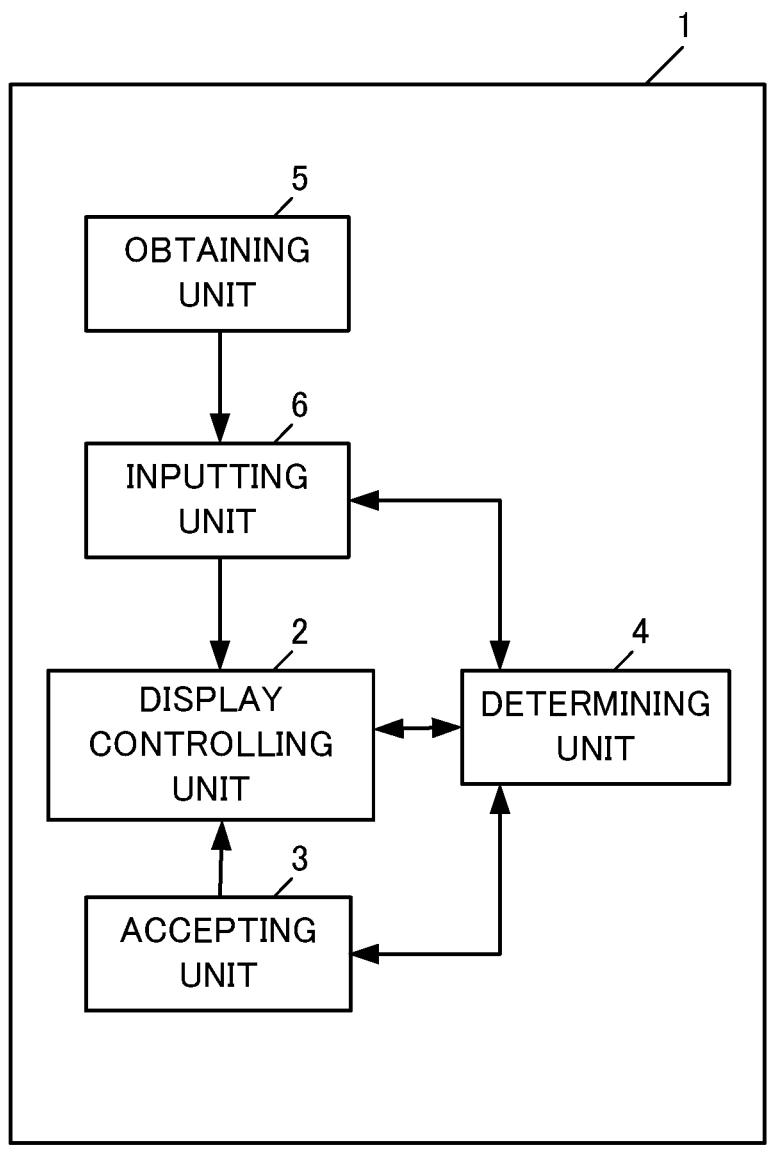
FIG. 5 is an explanatory diagram for a functional structure of the information processing system.

Next, a functional structure of the information processing system 1 will be described. As illustrated in FIG. 5, the information processing system 1 includes a display controlling unit 2, an accepting unit 3, a determining unit 4, an obtaining unit 5, and an inputting unit 6.

The display controlling unit 2 displays, on the terminal device 30, a first form containing a plurality of fields that can be entered by the user. The user enters the user attributes, such as a name and an e-mail address, into the first form.

In this embodiment, the controller 103 of the first server 10 transmits data constructing the first form to the terminal device 30 through the communicator 102, and the controller 306 of the terminal device 30 causes the image processor 302 to display the first form on the display 351.

The data constructing the first form is data described by, for example, HTML (HyperText Markup Language), XML (Extensible Markup Language), CSS (Cascading Style Sheets), or GIF (Graphics Interchange Format).

The controller 103 and communicator 102 of the first server 10 in cooperation with the controller 306 and image processor 302 of the terminal device 30 function as the display controlling unit 2.

The accepting unit 3 accepts the user's entry into the plurality of fields contained in the first form. The controller 306 of the terminal device 30 in cooperation with the input I/F 304 functions as the accepting unit 3.

The determining unit 4 determines whether or not each of the plurality of fields in the first form entered by the user satisfies a determination condition that is associated in advance with that field.

Example determination condition is whether or not letters and the like are entered in the name entry field, and the e-mail address is entered in the e-mail address entry field in a predetermined format. The determination condition may differ field by field, or may be the same. Details of the determination condition will be discussed later.

The controller 306 of the terminal device 30 and/or the controller 103 of the first server 10 functions as the determining unit 4.

Depending on the contents entered in the field by the user, the determination condition associated with that field may be satisfied or may not be satisfied. The field having the determination condition satisfied is referred to as a satisfied field, and the field that fails to satisfy the determination condition is referred to as an unsatisfied field.

If there is the unsatisfied field that fails to satisfy the determination condition among the plurality of fields entered by the user and in the first form, the display controlling unit 2 gives a higher priority to the unsatisfied field above the satisfied fields satisfying the determination condition among the plurality of fields entered by the user and in the first form to generate a second form having the unsatisfied field laid out preferentially.

In addition, the display controlling unit 2 displays the generated second form on the terminal device 30.

Next, the accepting unit 3 accepts the user's entry into a plurality of fields contained in the second form.

The first form may be entered by the user, or may be automatically entered through the information processing system 1.

In accordance with a request given by the terminal device 30 and containing information (user ID) that identifies the user, the obtaining unit 5 obtains, from the first server 10, the user information representing the user attributes stored in the first server 10 in advance in association with the user ID contained in this request.

In this embodiment, the controller 306 of the terminal device 30 transmits the user ID to the second server 20, and the controller 203 of the second server 20 obtains, from the first server 10, the user information associated with the received user ID. The controller 203 of the second server 20 transmits, to the terminal device 30, the user information obtained from the first server 10, and the controller 306 of the terminal device 30 obtains the user information from the second server 20.

The inputting unit 6 inputs the obtained user attributes in the fields corresponding to the user attributes that are obtained by the obtaining unit 5 from among the plurality of fields contained in the first form. The controller 306 of the terminal device 30 functions as the inputting unit 6.

Upon inputting of the user attributes through the inputting unit 6, the determining unit 4 determines whether or not each of the plurality of fields that is entered through the inputting unit 6 and contained in the first form satisfies the determination condition that is associated in advance with that field.

When there is the unsatisfied field that fails to satisfy the determination condition among the plurality of fields that is entered through the inputting unit 6 and contained in the first form, the display controlling unit 2 gives a higher priority to the unsatisfied field above the satisfied fields satisfying the determination condition among the plurality of fields that is entered through the inputting unit 6 and contained in the first form to generate the second form having the unsatisfied fields laid out preferentially.

In addition, the display controlling unit 2 displays the generated second form on the terminal device 30.

Still further, the accepting unit 3 accepts the user's entry in the plurality of fields contained in the second form.

Figure 6:
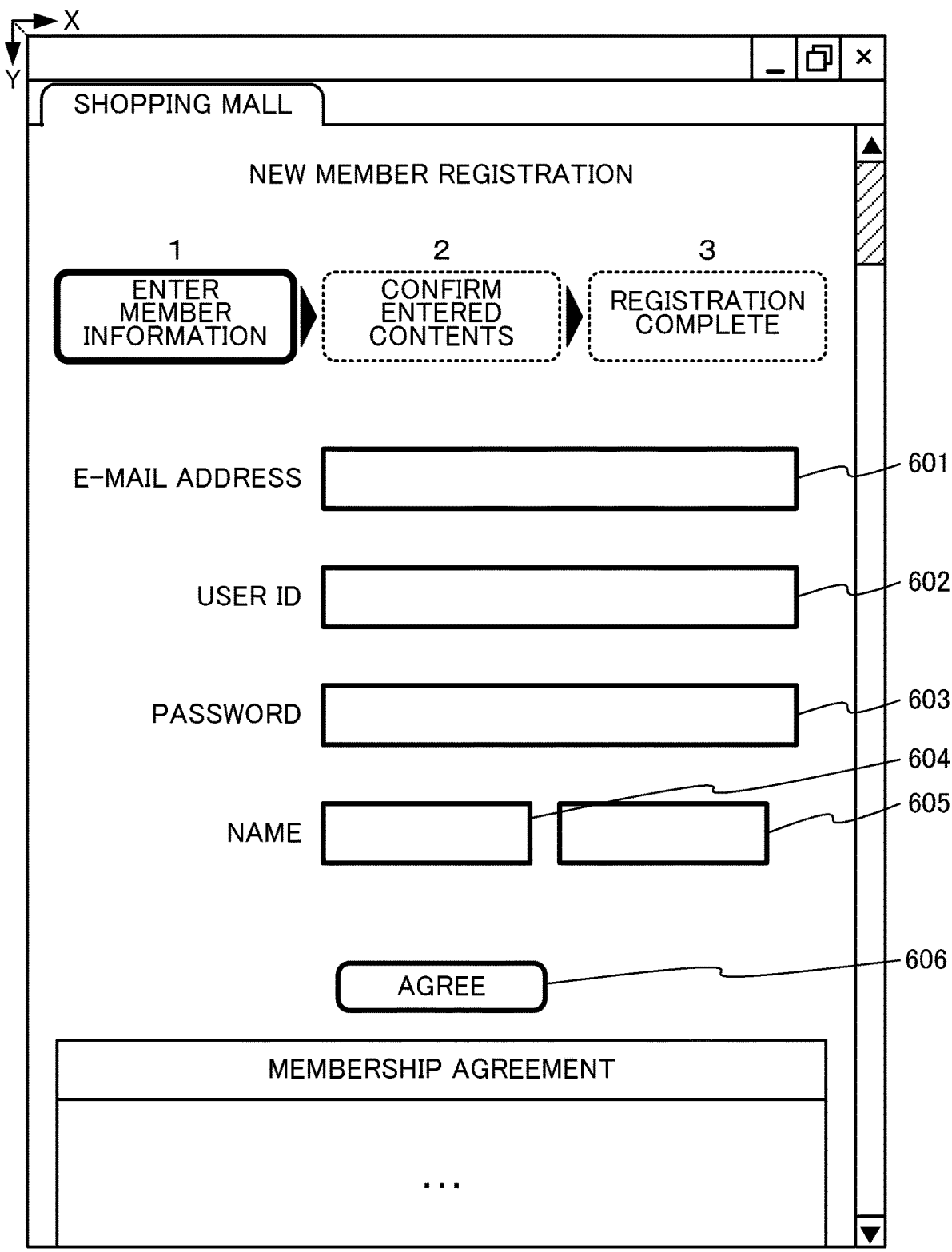
FIG. 6 is a diagram illustrating an example enter form for accepting an enter of user information on a first service.

Next, a registration process that the first server 10 registers, in the first database 151, the user information necessary for the user to utilize the first service will be described. FIG. 6 illustrates an example structure of the enter form that is displayed on the terminal device 30 when the user not registered with the first service yet newly registers with the first service. The user enters the user information through the enter form.

When user's instruction to start utilizing the first service is accepted, the controller 306 of the terminal device 30 transmits, to the first server 10, a request to start utilizing the first service. The controller 103 of the first server 10 transmits, to the terminal device 30, data constructing the enter form for accepting the entry of the user information. The controller 306 of the terminal device 30 displays the enter form for accepting the entry of the user information on the display 351, and accepts the entry of the user information.

More specifically, the controller 306 of the terminal device 30 displays a field 601 for accepting the entry of the user's e-mail address, a field 602 for accepting the entry of the user ID, a field 603 for accepting the entry of the password, fields 604 and 605 for accepting the entry of the name, and a button 606 for accepting the entry to agree with a membership agreement that is presented to the user.

The user pushes the button 606 after entering information in the fields 601 to 605. The controller 306 of the terminal device 30 transmits, to the first server 10, the information entered in the fields 601 to 605. The controller 103 of the first server 10 receives, from the terminal device 30, the information entered in the fields 601 to 605.

The controller 103 of the first server 10 determines whether or not the fields 601 to 605 satisfy the respective determination conditions that are associated in advance with the respective fields. More specifically, the controller 103 determines, for example, whether or not the format of the e-mail address is valid, whether or not the entered user ID is consistent with the other existing registered user ID, whether or not the password security meets predetermined security standards, and whether or not the name is entered.

When all fields 601 to 605 satisfy the determination conditions, that is, when there is nothing wrong with the information entered in the fields 601 to 605, the controller 103 notifies the terminal device 30 of the determination conditions being satisfied. The controller 306 of the terminal device 30 displays, on the display 351, a screen (unillustrated) for causing the user to confirm the entered contents. When the displayed contents are appropriate, the user enters an instruction to finalize the user information, and when an error is contained in the displayed contents, the user re-enters the user information in the fields 601 to 605. When the user information is finalized, the controller 103 of the first server 10 stores the user information in the first database 151.

When at least one of the fields 601 to 605 fails to satisfy the determination conditions, that is, when any of the pieces of information entered in the fields 601 to 605 contains an error, the controller 103 notifies the terminal device 30 of the determination condition being unsatisfied and that the necessity of correcting the entered contents. The controller 306 of the terminal device 30 again displays the enter form, and accepts the correction of the user information from the user.

For example, when the entered user ID is consistent with the other existing registered user ID, the controller 306 sets back the user ID field 602 to blank, displays a message to the effect that the entered user ID is consistent with the other existing registered user ID, and accepts the re-entry of the user information from the user.

Figure 7:
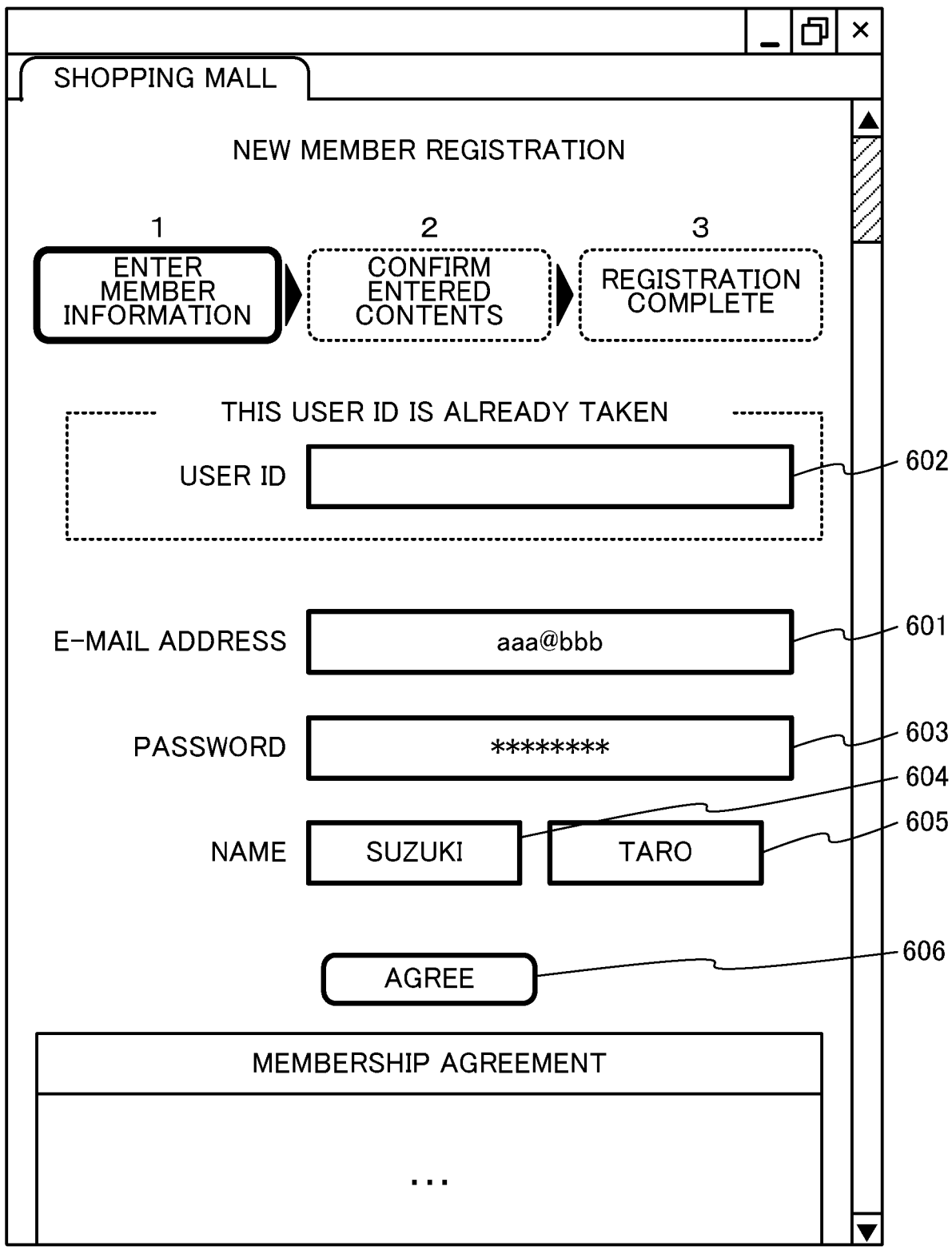
FIG. 7 is a diagram illustrating an example enter form having a field layout modified.

FIG. 7 illustrates an example structure of a screen for accepting the re-entry of the user information. The controller 306 displays the previously entered information in the fields 601, 603, 604, and 605 that do not need any re-entry. Although it is unnecessary for the user to re-enter the fields 601, 603, 604, and 605, the user can correct these fields.

The controller 306 displays the field 602 which does not satisfy the determination condition and needs the user's re-entry with a blank indication.

Note that, instead of setting the field 602 needing the re-entry to blank, the controller 306 may display the entered contents that are determined as containing an error in the field 602, and notify the user of the presence of the error in the entered contents.

In addition, the controller 306 gives a higher priority to the field 602 needing user's re-entry over other fields 601, 603, 604 and 605 to lay out this field preferentially. In this embodiment, the controller 306 lays out the field 602 that needs user's re-entry at the uppermost layer over the fields 601 to 605.

That is, although the field 601, the field 602, the field 603, and the fields 604 and 605 are initially displayed in this order from the uppermost layer of the screen as illustrated in FIG. 6, when there is a necessity to re-enter in the field 602, the display position of the field 602 is changed to the uppermost layer as illustrated in FIG. 7. Generally, information within a page is laid out in the order from the top to the bottom, and the higher the laid-out position is, the more the information is likely to get the user's attention. Accordingly, the controller 306 lays out the field 602 needing the re-entry at the uppermost layer position where it is presumed to get the highest attention. The controller 306 changes the positions of the fields 601 to 605 in accordance with the determination result by the first server 10.

In more general terms, the controller 306 changes the display position of the field 602 that fails to satisfy the determination condition to a position within a region where a webpage is visible to the user without scrolling a browser when this webpage is displayed on the terminal device 30, that is, within a so-called above-the-fold region. The display position of the field 602 is changed to, in a two-dimensional coordinate system (X-Y) having the upper left corner of the enter form as the origin, 5 a position that has a smaller Y-coordinate. The controller 306 reconstructs the enter form for the user information in accordance with the check result on the entry contents. The user can quickly understand what the user should enter since the field needing to get the user's attention is displayed within the above-the-fold region.

The reconstruction of the enter form is not limited to the case in which the user ID is consistent with another user ID. For instance, when the field 601 for entering the e-mail address is blank, or has an invalid format, when the field 602 for entering the user ID is blank, or contains an invalid character, when the field 603 for entering the password is blank, or contains an invalid character, and when the fields 604 and 605 for entering the name are blank, or contain an invalid character, the positions for laying out the respective fields 601 to 605 are also changed.

Figure 8:
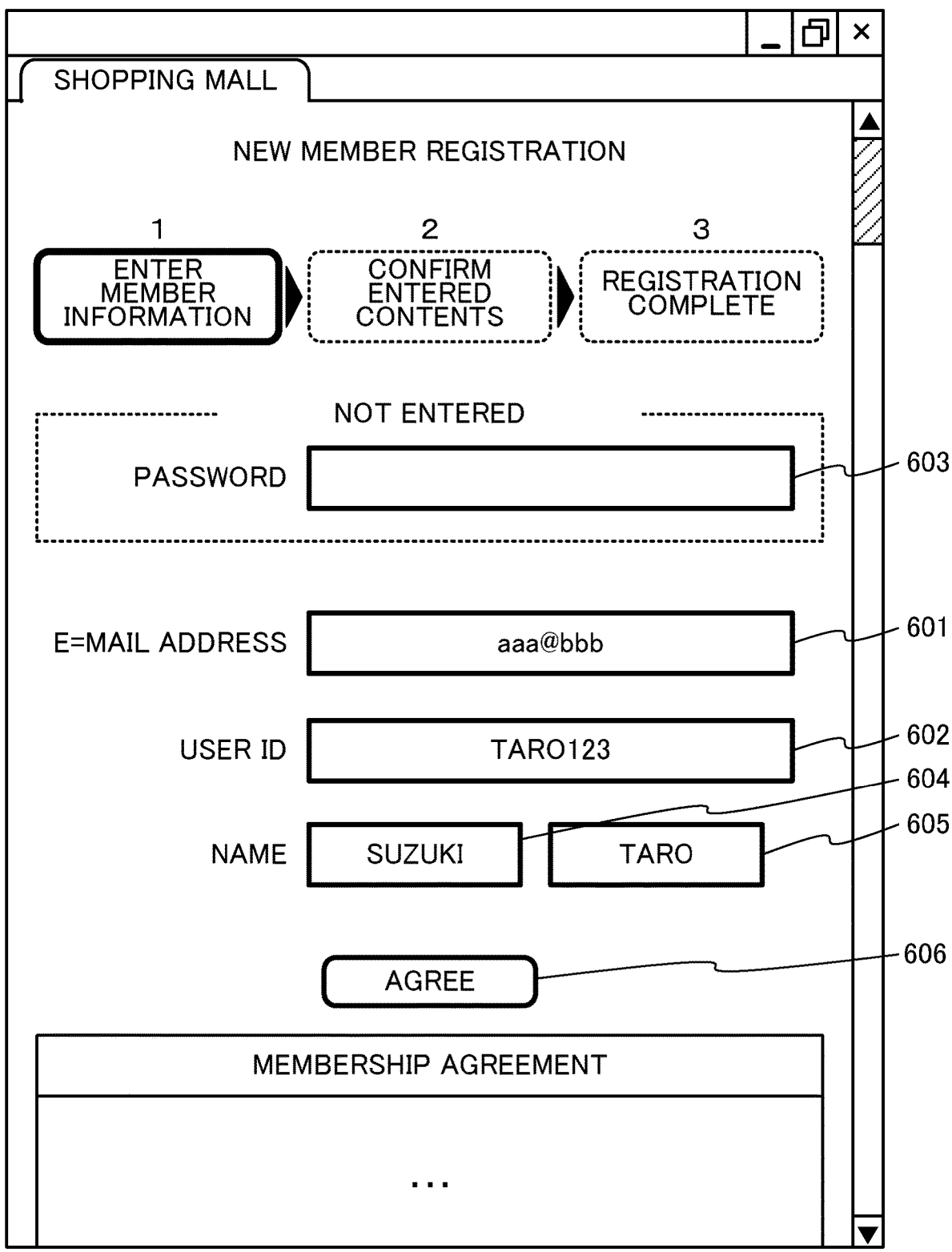
FIG. 8 is a diagram illustrating an example enter form having a field layout modified.

FIG. 8 illustrates an example structure of a screen for accepting the re-entry of the user information when the field 603 for entering the password is blank. The controller 306 changes the display position of the field 603 needing the user's re-entry to the uppermost layer. The controller 306 displays the previously entered information in the fields 601, 602, 604, and 605 that do not need a re-entry. The user can easily recognize that the user needs to re-enter the password since the field 603 for entering the password is laid out within the first viewable region, and is laid out at the highest layer.

Figure 9:
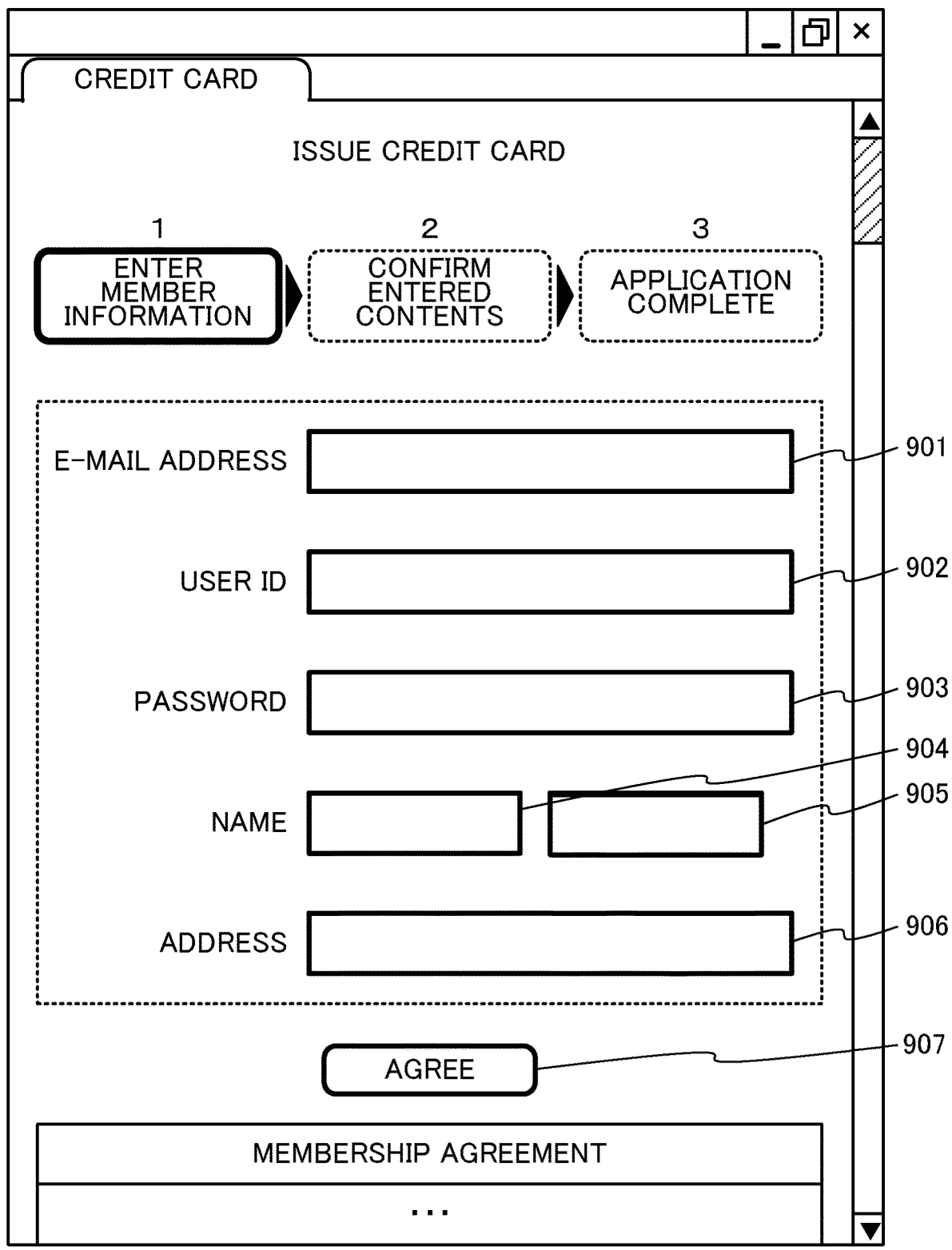
FIG. 9 is a diagram illustrating an example enter form for accepting an enter of user information on a second service.

Next, a process that the second server 20 registers, in the second database 251, the user information necessary for the user to utilize the second service will be described. FIG. 9 illustrates an example structure of the enter form that is displayed on the terminal device 30 when the user not registered with the second service yet newly registers with the second service.

When accepting user's instruction to start utilizing the second service, the controller 306 of the terminal device 30 transmits, to the second server 20, a request to start utilizing the second service. The controller 203 of the second server 20 transmits, to the terminal device 30, data constructing the enter form for accepting the entry of the user information. The controller 306 of the terminal device 30 displays the enter form for accepting the entry of the user information on the display 351, and accepts the entry of the user information.

More specifically, the controller 306 of the terminal device 30 displays a field 901 for accepting the entry of the user's e-mail address, a field 902 for accepting the entry of the user ID, a field 903 for accepting the entry of the password, fields 904 and 905 for accepting the entry of the name, a field 906 for accepting the entry of the address, and a button 907 for accepting the entry to agree with the membership agreement that is presented to the user.

The enter form illustrated in FIG. 9 differs from the enter form illustrated in FIG. 6 in that the field 906 for accepting the entry of mailing address is further added.

The user pushes the button 907 after entering information in the fields 901 to 906. The controller 306 of the terminal device 30 transmits, to the second server 20, the information entered in the fields 901 to 906. The controller 203 of the second server 20 receives, from the terminal device 30, the information entered in the fields 901 to 906.

The controller 203 of the second server 20 determines whether or not the fields 901 to 906 satisfy respective determination conditions that are set in advance. More specifically, the controller 203 determines, for example, whether or not the format of the e-mail address is valid, whether or not the entered user ID is consistent with the other existing registered user ID, whether or not the password security meets predetermined security standards, whether or not the name is entered, and whether or not the mailing address is entered.

When all fields 901 to 906 satisfy the determination conditions, that is, when there is nothing wrong with the information entered in the fields 901 to 906, the controller notifies the terminal device 30 of the determination conditions being satisfied. The controller 306 of the terminal device 30 displays, on the display 351, a screen (unillustrated) for causing the user to confirm the entered contents. When the displayed contents are appropriate, the user enters an instruction to finalize the user information, and when an error is contained in the displayed contents, the user re-enters the user information in the fields 901 to 906. When the user information is finalized, the controller 203 of the second server 20 stores the user information in the second database 251.

When at least one of the fields 901 to 906 fails to satisfy the determination conditions, that is, when any of the pieces of information entered in the fields 901 to 906 contains an error, the controller 203 notifies the terminal device 30 of the necessity of correcting the entered contents. The controller 306 of the terminal device 30 accepts the correction of the user information from the user.

Similar to the enter form of the first service, the controller 306 sets blank in the field that does not satisfy the determination condition and needs to be re-entered, and lays out this field at the uppermost layer among the fields 901 to 906.

Note that, instead of setting the field needing the re-entry to be blank, the controller 306 may directly display, in this field, the entered contents that are determined as containing an error.

The controller 306 lays out the field needing the re-entry within the first viewable region. The controller 306 reconstructs the enter form for the user information in accordance with the check result on the entered contents.

When, for example, the user ID is consistent with the other user ID or is not entered, the controller 306 lays out the field 902 for accepting the re-entry of the user ID at the uppermost layer among the fields 901 to 906. The user can quickly understand what the user should enter since the field needing to get the user's attention is laid out within the first viewable region, and displayed at the uppermost layer.

Conventionally, when the user who is already registered with the first service but not registered with the second service yet desires to start utilizing the second service, this user needs to re-enter the same or similar user information. For example, when the enter form illustrated in FIG. 6 and the enter form illustrated in FIG. 9 are compared with each other, the fields for entering the e-mail address, the user ID, the password, and the name are commonly contained in both enter forms. This is not convenient for the user because these pieces of information have to be entered twice. Thus, in this embodiment, the controller 203 of the second server 20 obtains, from the first server 10 and not through the user's entry, the common items to those contained in the user information stored in the first database 151 among the items contained in the user information stored in the second database 251. In addition, as for the items other than those obtained from the first database 151, the second server 20 receives these items from the terminal device 30. The user can simply enter the items that are not obtained from the first server 10 by the second server 20.

Figure 10:
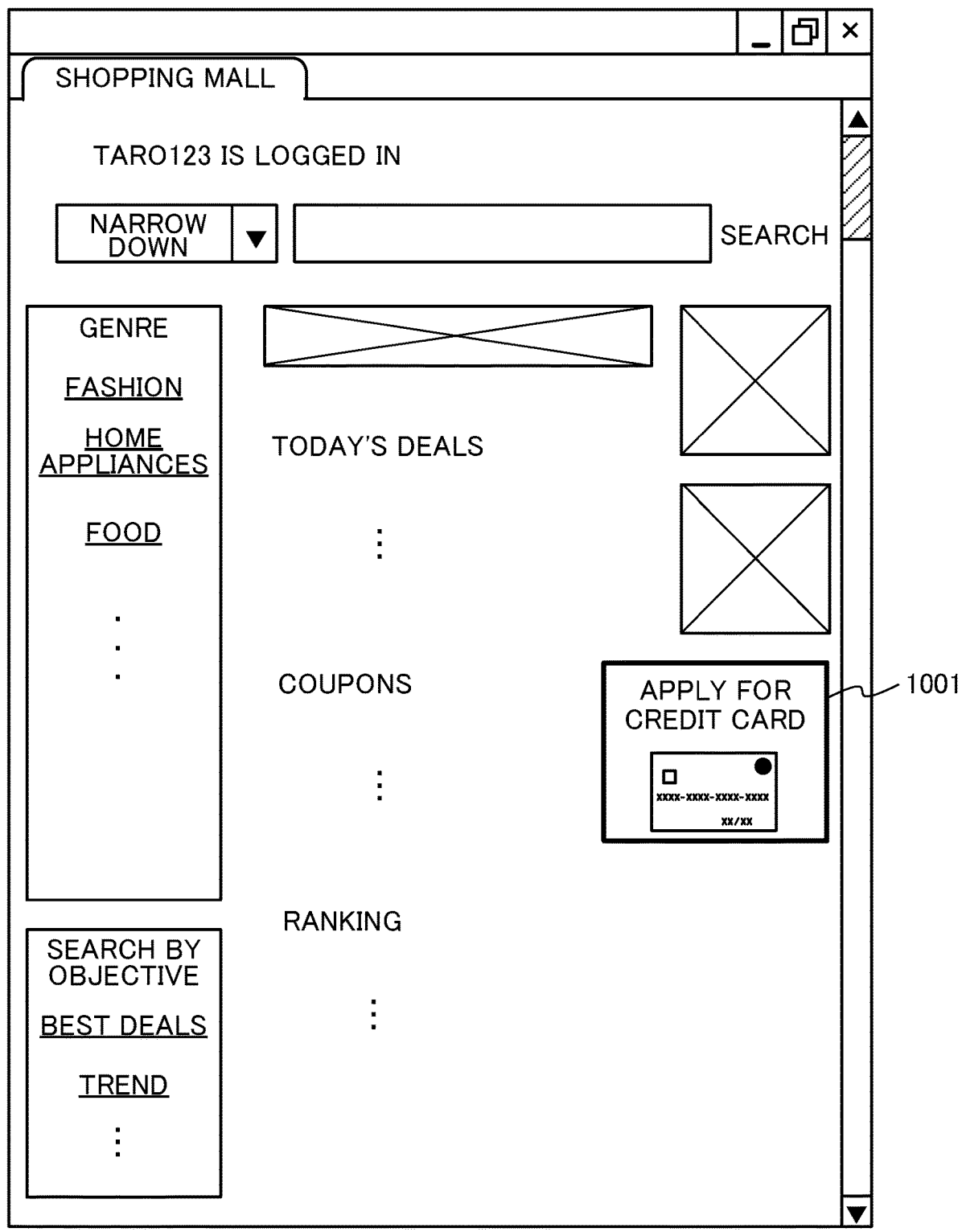
FIG. 10 is a diagram illustrating an example screen for the first service linked with the second service.

When, for example, the user currently utilizing the first service (the electronic shopping mall) desires to subscribe the second service (the credit card service), this user clicks or taps a banner advertisement 1001 and the like relative to the second service within a webpage of the first service illustrated in FIG. 10, and the user is transferred to a webpage relating to the second service.

The controller 306 of the terminal device 30 accesses the webpage indicated by a URI (Uniform Resource Identifier) associated with the banner advertisement 1001 relating to the second service.

For the purposes of simplifying the description in this embodiment, it is assumed that the URI associated with the banner advertisement 1001 indicates a region managed by the second server 20.

The controller 306 of the terminal device 30 transmits, to the second server 20, the user ID that is registered for the user information of the first service.

Note that the information transmitted by the terminal device 30 to the second server 20 is not limited to the user ID, and may be any information that is capable of uniquely identifying the user. Instead of the user ID, the controller 306 may transmit, for example, the e-mail address to the second server 20.

The controller 203 of the second server 20 receives, from the terminal device 30, the user ID registered for the user information of the first service. The controller 203 obtains the user ID of the user who has requested the start of utilizing the second service.

The controller 203 obtains, from the first server 10, user information of the first service that is associated with the obtained user ID.

More specifically, the controller 203 of the second server 20 transmits, to the first server 10, a request for obtaining the user ID that has been obtained as well as the password, the e-mail address, the last name and the first name that are associated with the obtained user ID. When receiving this request, the controller 103 of the first server 10 searches the first database 151, and obtains the password, the e-mail address, the last name and the first name that are associated with the user ID. Subsequently, the controller 103 of the first server 10 transmits, to the second server 20, the obtained password, e-mail address, last name and first name. The controller 203 of the second server 20 receives, from the second server 20, the password, the e-mail address, the last name and the first name.

Note that, the controller 103 of the first server 10 having received the user ID transmits, to the second server 20, the e-mail address, the last name and the first name that are associated with the user ID, but a structure may be employed in which the password associated with the user ID is not transmitted to the second server 20. That is, the user may be always requested to enter the password.

The controller 203 of the second server 20 transmits, to the terminal device 30, the data constructing the enter form for accepting the entry of the user information for the second service and the user information obtained from the first server 10.

The controller 306 of the terminal device 30 receives, from the second server 20, the data constructing the enter form, and the user information obtained from the first server 10. The controller 306 displays, on the display 351, the enter form for accepting the entry of the user information for the second service.

The controller 306 determines that the fields corresponding to the common items to the user information of the first service and the user information of the second service satisfy the determination condition, and determines that the fields that are not common to the user information of the first service and the user information of the second service do not satisfy the determination condition.

The common items to the user information of the first service among the user information of the second service, namely, the user ID, the password, the last name and the first name, are already obtained from the first server 10. The controller 306 of the terminal device 30 displays the e-mail address obtained from the second server 20 in the field 901 for accepting the entry of the e-mail address, displays the user ID obtained from the second server 20 in the field 902 for accepting the user ID entry, displays, in the field 903 for accepting the password entry, predetermined symbols (for example, an asterisk "*") indicating that the password has been already obtained, and displays the name obtained from the second server 20 in the fields 904 and 905 for accepting the name entry.

Conversely, the controller 306 of the terminal device 30 sets the field 906 to be blank for accepting the entry of an "address" that is contained in the user information of the second service but not contained in the user information of the first service.

Furthermore, the controller 306 of the terminal device 30 gives a higher priority to the field 906 for accepting the mailing address over other fields 901 to 905 to lay out this field preferentially. In this embodiment, the controller 306 lays out this field within the first viewable region and at the uppermost layer among all fields 901 to 906. That is, the field 906, the field 901, the field 902, the field 903, the fields 904 and 905 are laid out in this order from the top to the bottom.

The controller 306 may determine that the fields corresponding to the items that are obtained from the first server 10 by the second server 20 satisfy the determination conditions, and may determine that the fields corresponding to the items that are not obtained from the first server 10 by the second server 20 fail to satisfy the determination conditions.

Figure 11:
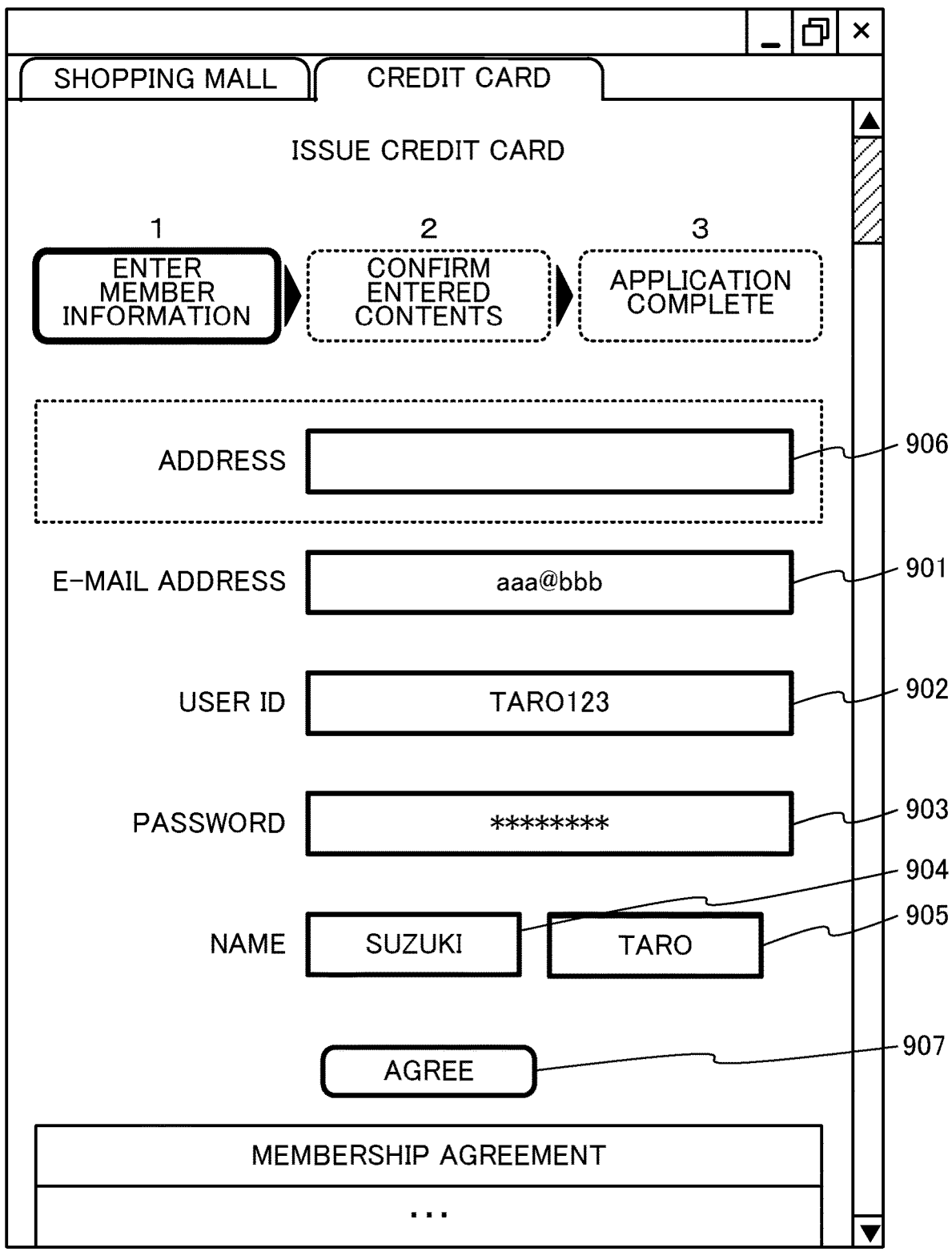
FIG. 11 is a diagram illustrating an example enter form having a field layout modified.

When the second server 20 does not obtain, from the first server, the user information of the first service, as illustrated in FIG. 9, the controller 306 of the terminal device 30 sets the field 901, the field 902, the field 903, the fields 904 and 905, and the field 906 to be blank and displays these fields in this order from the top to the bottom. Conversely, as illustrated in FIG. 11, when the second server 20 obtains the user information of the first service from the first server, the blank field 906 is displayed at the uppermost layer, and the user information obtained from the first server 10 is displayed in the rest of the fields that are the field 901, the field 902, the field 903, and the fields 904 and 905. The user can easily understand that the user needs to enter only a new address. In addition, the user need not enter twice the common items between the first service and the second server 20, thereby saving the time of the user for entering.

Note that the user may change, in part or in whole, the user information transferred from the first service without directly utilizing the user information. The controller 306 of the terminal device 30 displays, in the field 901, the field 902, the field 903, and the fields 904 and 905, the user information obtained from the first server 10. When, however, these pieces of user information are changed by the user, the changed user information is transmitted to the second server 20 as the user information for the second service.

When there is a plurality of items not obtained from the first server 10, the controller 306 of the terminal device 30 lays out the respective entry fields for the items that are not obtained from the first server 10 at layers over the entry fields for the items obtained from the first server 10. In addition, the controller 306 lays out each of the entry fields for the items that are not obtained from the first server 10 in the order according to a default enter form from the top to the bottom.

Figure 12:
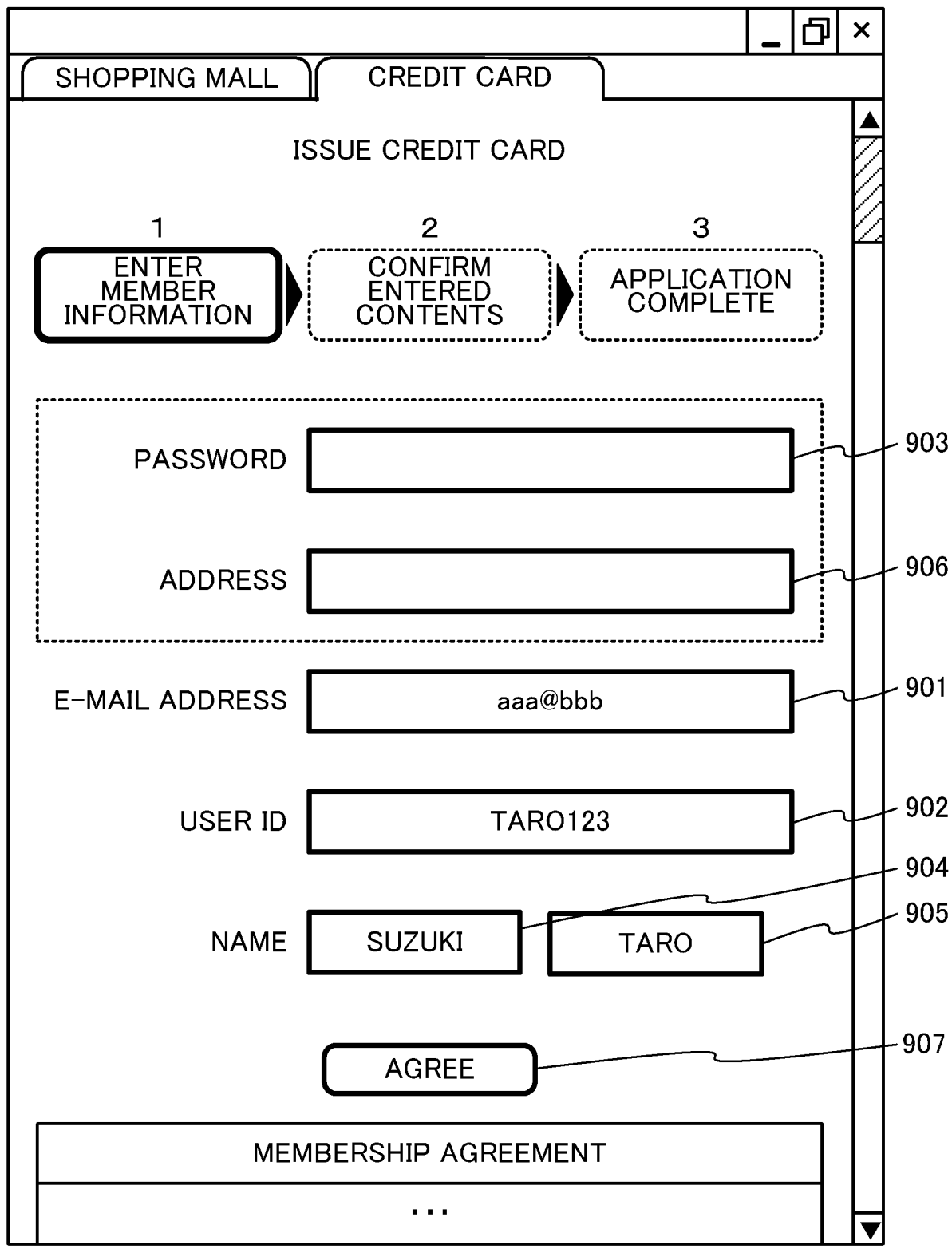
FIG. 12 is a diagram illustrating an example enter form having a field layout modified.

For example, as illustrated in FIG. 12, when both address and password are not obtained from the first server 10, the controller 203 of the second server 20 lays out the blank field 903 for accepting the entry of the password, and blank field 906 for accepting the entry of the mailing address in this order from the top, and further lays out, below those fields, the field 901 for accepting the entry of the e-mail address, the field 902 for accepting the entry of the user ID, and the fields 904 and 905 for accepting the entry of the name.

The controller 306 may emphasize the fields for accepting the entry of the items that are not obtained from the first server 10 by, for example, displaying these fields with a color different from that of the fields for accepting the entry of the items obtained from the first server 10, and by enlarging a font size.

There are various ways of emphasizing the items, and in addition to the color change and the font size change, blinking indication, addition of image, addition of message, addition of sound, and a voice guidance may be adopted.

Figure 13:
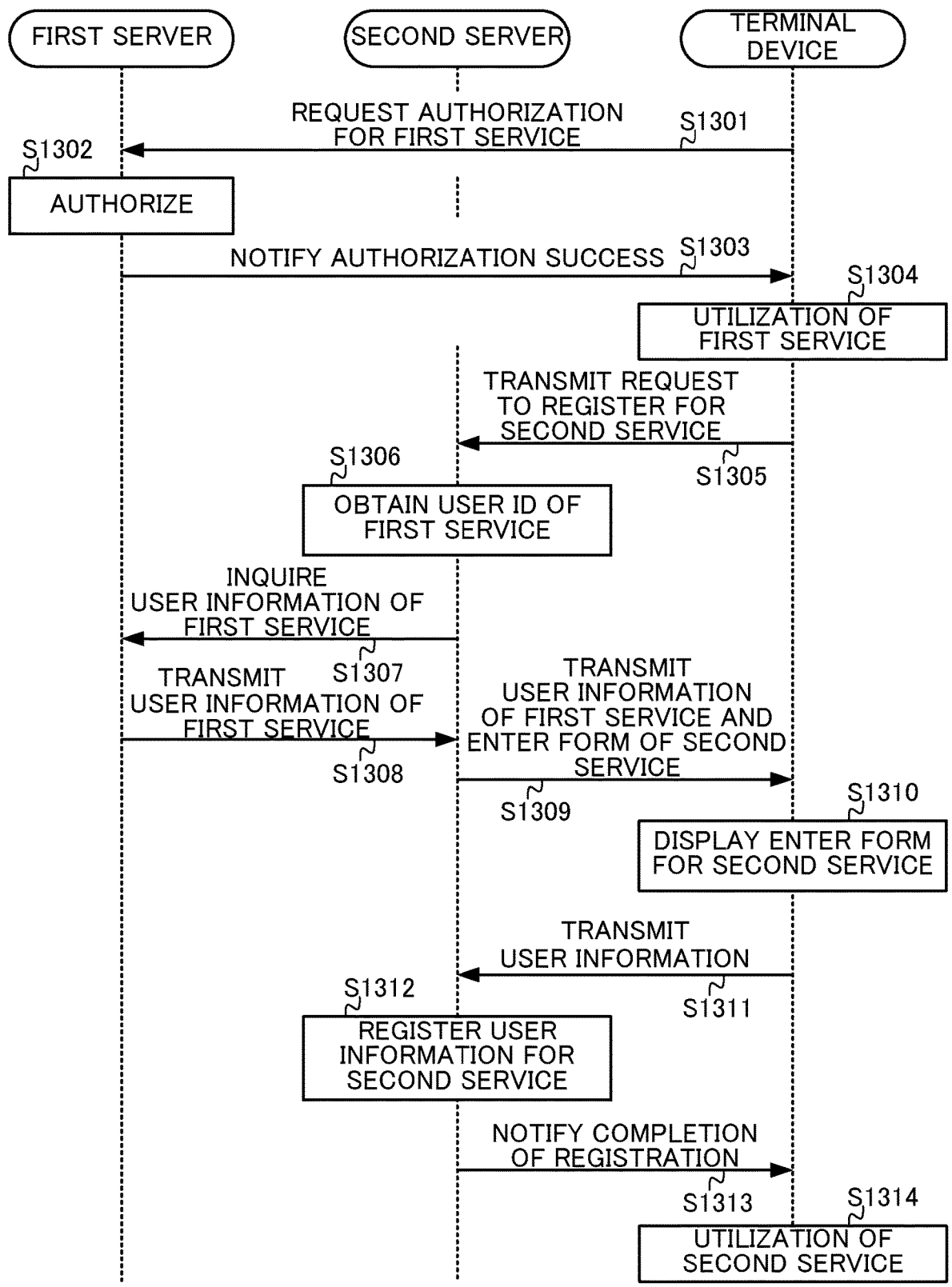
FIG. 13 illustrates a flowchart for explaining a registration process of registering user information.

Next, a registration process that the first server 10 in cooperation with the second server 20 registers the user information will be described with reference to a flowchart of FIG. 13. Hereinafter, a registration process of the user information for the second service to newly register the user already registered with the first service (the electronic shopping mall) provided by the first server 10 with the second service (credit card) provided by the second server 20 will be described.

The controller 306 of the terminal device 30 requests (step S1301), based on a user's instruction, an authentication of the user for the first service. The user enters the user ID and the password that are registered in the first server 10 in advance. The terminal device 30 transmits, to the first server 10, the user ID and the password that are entered by the user.

The controller 103 of the first server 10 checks the user ID and the password both received from the terminal device 30 with the user ID and the password both stored in the first database 151 in advance to authenticate the user (step S1302). When these pieces of information match, the controller 103 notifies the terminal device 30 of the authentication being successful (step S1303). The controller 306 of the terminal device 30 starts the utilization of the first service (step S1304). The controller 306 of the terminal device 30 displays, for example, a webpage illustrated in FIG. 10 on the display 351, and provides the first service to the user.

Note that when the user ID and the password both received from the terminal device 30 do not match the user ID and the password stored in the first database 151 in advance, the controller 103 notifies the terminal device 30 of the authentication being failed. The terminal device 30 requests the user to re-enter the user ID and the password.

The process from the step S1301 to the step S1303 is hereinafter called a login process. The authentication of the user, through the login process, as a registered user for the first service is hereinafter described as, "the user logs in the first service".

The controller 306 of the terminal device 30 transmits, to the second server 20 based on an instruction from the user who logs in the first service, a request to register for the second service and to start utilizing the second service (step S1305). When the banner advertisement 1001 containing a link to the second service is clicked on the webpage illustrated in FIG. 10, the controller 306 accesses an URI indicated by the link, and transfers the webpage to a webpage for the second service.

The controller 306 of the terminal device 30 transmits, to the second server 20, the user ID that is one of the pieces of user information of the first service. The controller 203 of the second server 20 obtains the user ID of the first service from the terminal device 30 (step S1306).

The controller 203 of the second server 20 inquires, to the first server 10, about the user information associated with the user ID of the first service (step S1307). That is, the controller 203 transmits, to the first server 10, the user ID obtained in the step S1306, and requests the first server 10 to transmit the e-mail address, password, last name and first name that are associated with this user ID.

The controller 103 of the first server 10 searches the first database 151, obtains the user information associated with the received user ID, and transmits the obtained user information to the second server 20 (step S1308). In this embodiment, the controller 103 transmits, to the second server 20, the e-mail address, password, last name and first name that are associated with the user ID.

The controller 203 of the second server 20 receives the user information of the first service from the first server 10.

In response to the request in the step S1305, the controller 203 of the second server 20 transmits, to the second server 20, the user information of the first service that has been received, and the data constructing the enter form for accepting the entry of the user information for the second service (step S1309).

The controller 306 of the terminal device 30 receives, from the second server 20, the user information of the first service and the data constructing the enter form. The controller 203 displays, on the display 351, the enter form for accepting the entry of the user information of the second service (step S1310). The controller 203 accepts the entry of the user information from the user.

In this case, the controller 306 reconstructs the enter form and displays this enter form on the display 351. The controller 306 lays out, among the fields contained in the enter form, the field that corresponds to an item which is not contained in the user information received from the second server 20 at a layer over the fields corresponding to the items that are contained in the user information received from the second server 20. The controller 306 displays the blank field corresponding to the item that is not contained in the user information received from the second server 20.

When, for example, the e-mail address, the password, the last name and the first name are received from the second server 20 as the user information of the first service, as illustrated in FIG. 11, the controller 306 lays out the field 906 for accepting the entry of the address that is not contained in the user information of the first service among the fields 901 to 906 for accepting the entry of the user information of the second service at the higher layer than the rest of the fields 901 to 905. In addition, the controller 306 displays the blank field 906 for accepting the entry of the address.

Furthermore, the controller 306 lays out the fields that fail to satisfy the determination conditions, that is, the fields corresponding to the items contained in the user information that are received from the second server 20 among the fields contained in the enter form at the layers below the fields for accepting the items that are not contained in the user information of the first service. The controller 306 displays the user information received from the second server 20 in the fields that satisfy the determination conditions, that is, the fields corresponding to the items contained in the user information received from the second server 20.

For example, as illustrated in FIG. 11, the controller 306 lays out the fields 901 to 905 for accepting the e-mail address, the user ID, the password, the last name and the first name that are contained in the user information of the first service at the layer below the field 906 for accepting the entry of the address that is not contained in the user information of the first service. The controller 306 displays, in the field 901 for accepting the entry of e-mail address, the e-mail address that is indicated by the user information received from the second server 20, displays, in the field 902 for accepting the entry of the user ID, the user ID indicated by the user information received from the second server 20, displays predetermined symbols in the field 903 for accepting the password entry, and displays, in the fields 904 and 905 for accepting the entry of the name, the name that is indicated by the user information received from the second server 20.

As a result, a field corresponding to the item that is not obtained from the first server 10 by the second server 20 among the items contained in the user information of the second service is laid out at the upper layer of the screen within the first viewable region, and below this field, the fields corresponding to the items that are obtained from the first server 10 by the second server 20 are laid out. The user can quickly understand which item has not been obtained from the first server 10 by the second server 20, and can instantly determine what the user should enter.

The user information obtained from the first server 10 by the second server 20 is automatically displayed in the fields corresponding to the items common between the user information of the first service and the user information of the second service. The user can save time for entering the items that are already obtained from the first server 10 by the second server 20.

Note that in FIG. 11, the user ID of the second service is assumed to be the same as the user ID of the first service, but these user IDs may be different from each other. As for the user information for the second service, the user can specify a different user ID from the user ID of the first service. When the field 902 for accepting the entry of the user ID is corrected by the user, and the different user ID from the user ID of the first service is entered, the controller 306 transmits the corrected user ID to the second server 20.

Similarly, the e-mail address, the password, the first name and the last name may be the same or different between the first service and the second service.

The user enters the user information of the second service in the reconstructed enter form. The controller 306 of the terminal device 30 transmits the entered user information to the second server 20 (step S1311). The controller 203 of the second server 20 receives the user information from the terminal device 30.

The controller 203 of the second server 20 stores, in the second database 251, the user information received from the terminal device 30 (step S1312).

The controller 203 of the second server 20 notifies the terminal device 30 of the completion of the registration of the user information (step S1313).

The controller 306 of the terminal device 30 displays, on the display 351, information to the effect that the registration of the user information is complete, and starts the utilization of the second service (step S1314).

According to this embodiment, the enter form for accepting the entry of the user information is reconstructed as needed according to the check results of the entered contents, and such enter form is then displayed. The fields that should be entered by the user are laid out at locations where the highest attention can be gotten, typically, within the first viewable region. The user can quickly determine what item the user should enter or re-enter, thereby improving the efficiency of the enter work. In addition, the cooperation of the first database 151 and the second database 251 allows the user not to enter duplicate contents, thereby reducing the burden on the user.

In this embodiment, the terminal device 30 reconstructs the enter form, and changes the layout of the fields for accepting the user's entry. However, the second server 20 may reconstruct the enter form, and transmit, to the terminal device 30, the enter form that is reconstructed by the second server 20, and, the terminal device 30 may display, on the display 351, the enter form reconstructed by the second server 20.

In this embodiment, the controller 203 of the second server 20 obtains, from the terminal device 30, the user ID for the first service. However, the controller 203 may obtain the user ID of the first service from the first server 10.

In this case, the controller 306 of the terminal device 30 transmits in the step S1305, not to the second server 20 but to the first server 10, the user ID of the first service and the request to the registration for the second service.

Furthermore, in the step S1308, the controller 103 of the first server 10 obtains, from the first database 151, the user information associated with the received user ID, and transmits, to the second server 20, the obtained user information and the request to register for the second service. The steps S1306 and S1307 are omitted.

Note that the enter form with the layout of the fields 601 to 605 being unchanged as illustrated in FIG. 6, and the enter form with the layout of the fields 901 to 906 being unchanged as illustrated in FIG. 9 are each referred to as, a "first form". In addition, the enter form with a layout of the fields 601 to 605 being changed as illustrated in FIG. 7, and the enter form with a layout of the fields 901 to 906 being changed as illustrated in FIG. 11 are each referred to as, a "second form".

Second Embodiment

Next, another embodiment will be described. In the aforementioned embodiment, the registration process of the user information is carried out by the first service and the second service in corporation with each other. Conversely, in this embodiment, only a single service is provided to the user. Depending on the contents entered by the user, an enter form for an online questionnaire that is provided to the user by the first server 10 is reconstructed. The second server 20 may be omitted.

Figure 14:
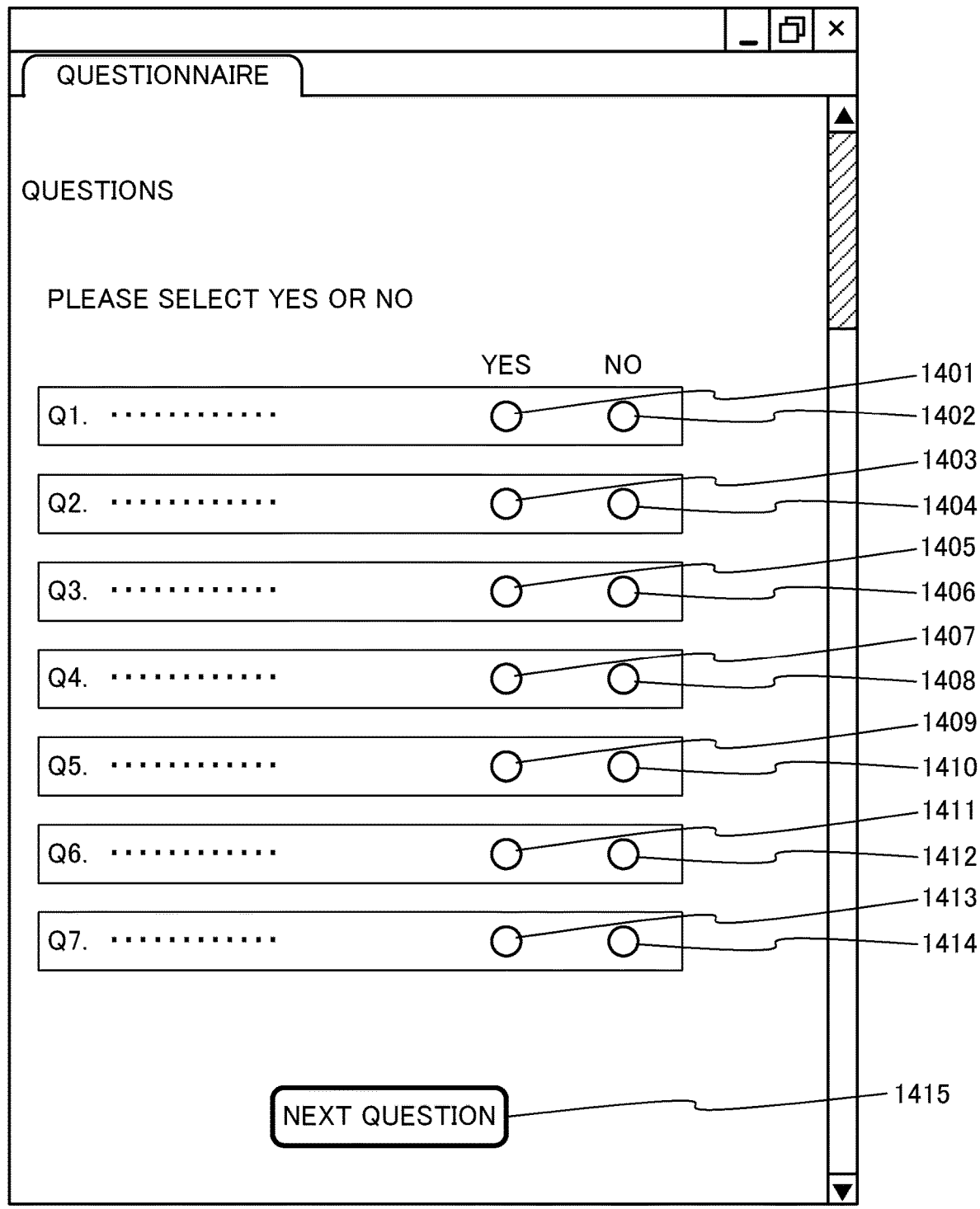
FIG. 14 is a diagram illustrating an example enter form that is presented to a user.

FIG. 14 illustrates an example structure of the enter form for the online questionnaire in this embodiment. In the enter form illustrated in FIG. 14, radio buttons 1401 to 1414 for selecting either YES or NO for each of seven questions are prepared. The user is requested to select either YES or NO for each question. In the following description, a set of a question and radio buttons is referred to as, an answer field.

The user enters an answer in each answer field. When the user pushes the button 1415 that instructs the progress to the next page, the controller 306 of the terminal device 30 determines whether or not each answer field satisfies a determination condition.

In this embodiment, the controller 306 determines, for each answer field, whether YES or NO has been selected. Whether there is anything wrong with the entered contents or not is determined by not the first server 10 or the second server 20 but by the terminal device 30.

When all answer fields satisfy the respective determination conditions, that is, when either YES or NO has been selected, the controller 306 transmits the entered answers to the first server 10. The controller 103 of the first server 10 receives the answers, and stores these answers in a database (unillustrated) for storing an answer result of the questionnaire. Next, the controller 103 transmits, to the terminal device 30, data constructing an enter form for the next question.

Conversely, when at least any one of the answer fields fails to satisfy the determination condition, that is, when there is an answer field with neither YES nor NO being entered, the controller 306 lays out the answer field with no answer entered at a layer over the answer fields that have the answers entered, and displays again the enter form. The controller 306 accepts the user's entry through the reconstructed enter form.

Figure 15:
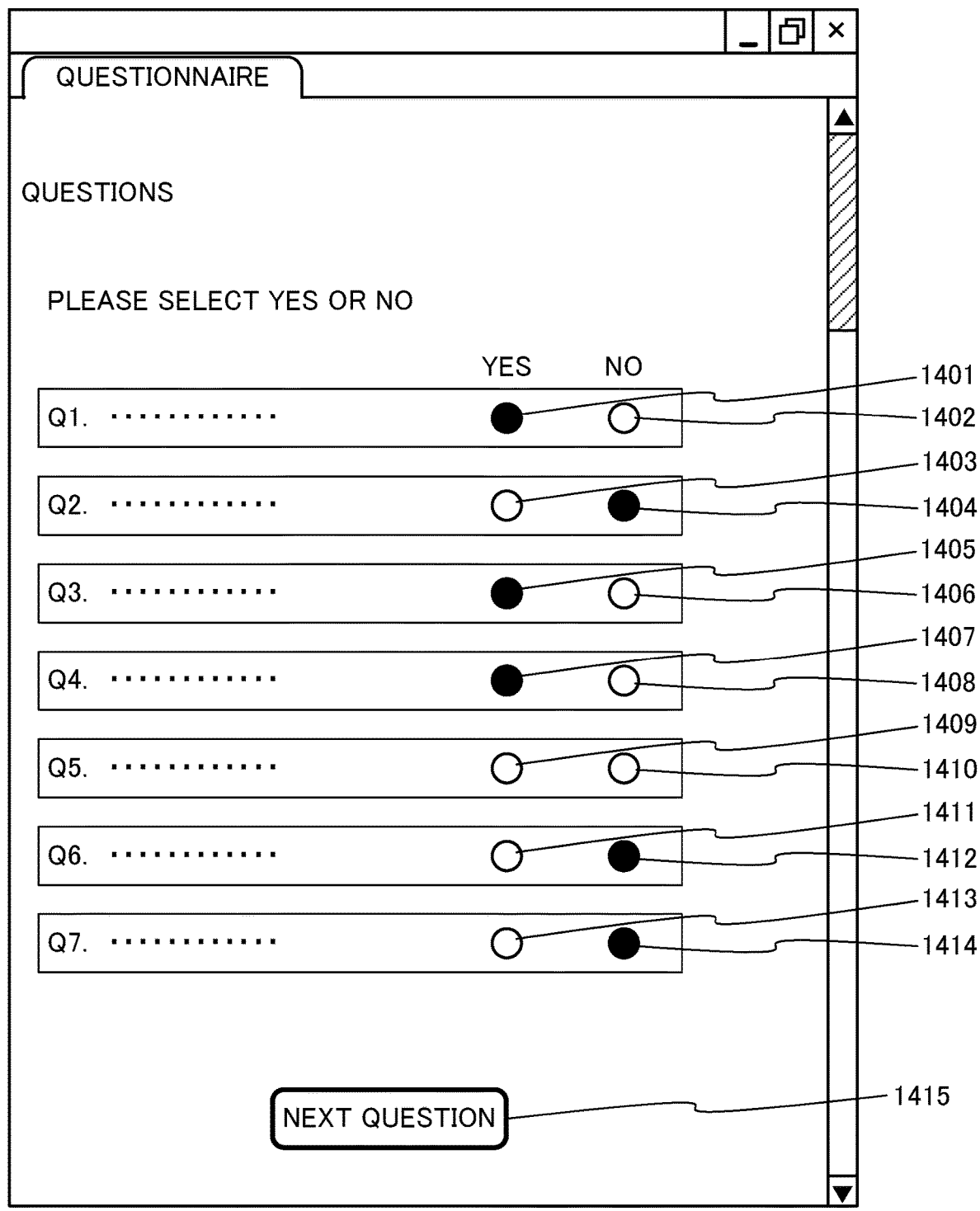
FIG. 15 is a diagram illustrating an example structure of an enter form having an answer entered by the user.
Figure 16:
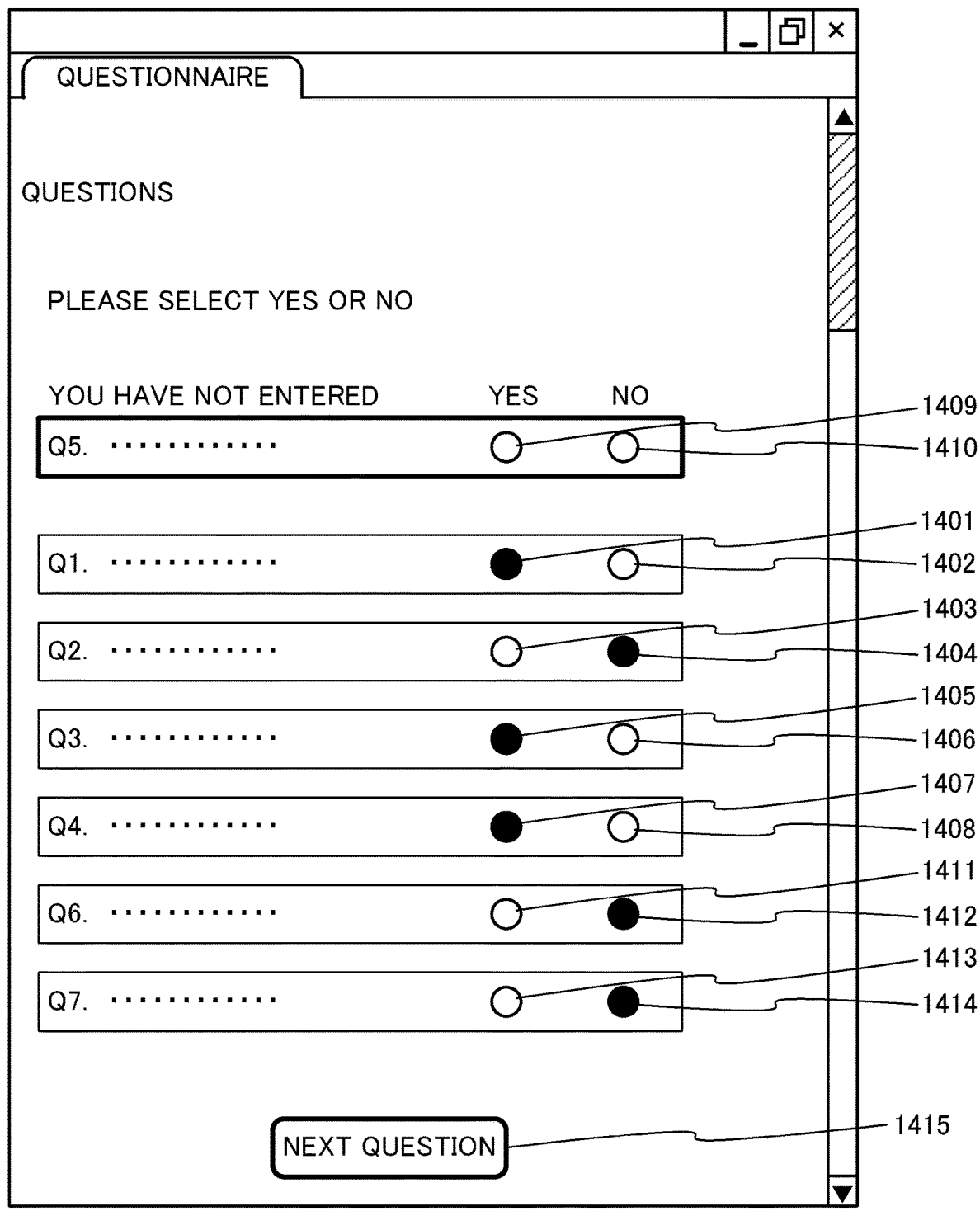
FIG. 16 is a diagram illustrating an example enter form having a field layout modified.

FIG. 15 illustrates an example structure of the enter form in which the user has entered the answers. In FIG. 15, no answer is entered in the fifth answer field (Q5) from the top. When the button 1415 is pushed by the user without entering any answer in the fifth answer field, the controller 306 of the terminal device 30 determines that the fifth answer field fails to satisfy the determination condition, and as illustrated in FIG. 16, lays out the fifth answer field with no answer entered at the uppermost layer, and lays out, below this answer field, the rest of the answer fields. In FIG. 16, the fifth answer field with no answer entered, a first answer field, a second answer field, a third answer field, a fourth answer field, a sixth answer field, and a seventh answer field are laid out in this order from the top to the bottom.

Thus, the answer field with no answer entered is laid out at the upper layer where it is likely to initially get the highest attention from the user. This allows the user to quickly determine which answer field the user should review.

The controller 306 may display the answer field with no answer entered in a relatively more emphasized manner to other answer fields. For example, the controller 306 may emphasize the answer field with no answer entered by changing the display color of the answer field, enlarging the font size, blinking indication, addition of image, and the like.

Figure 17:
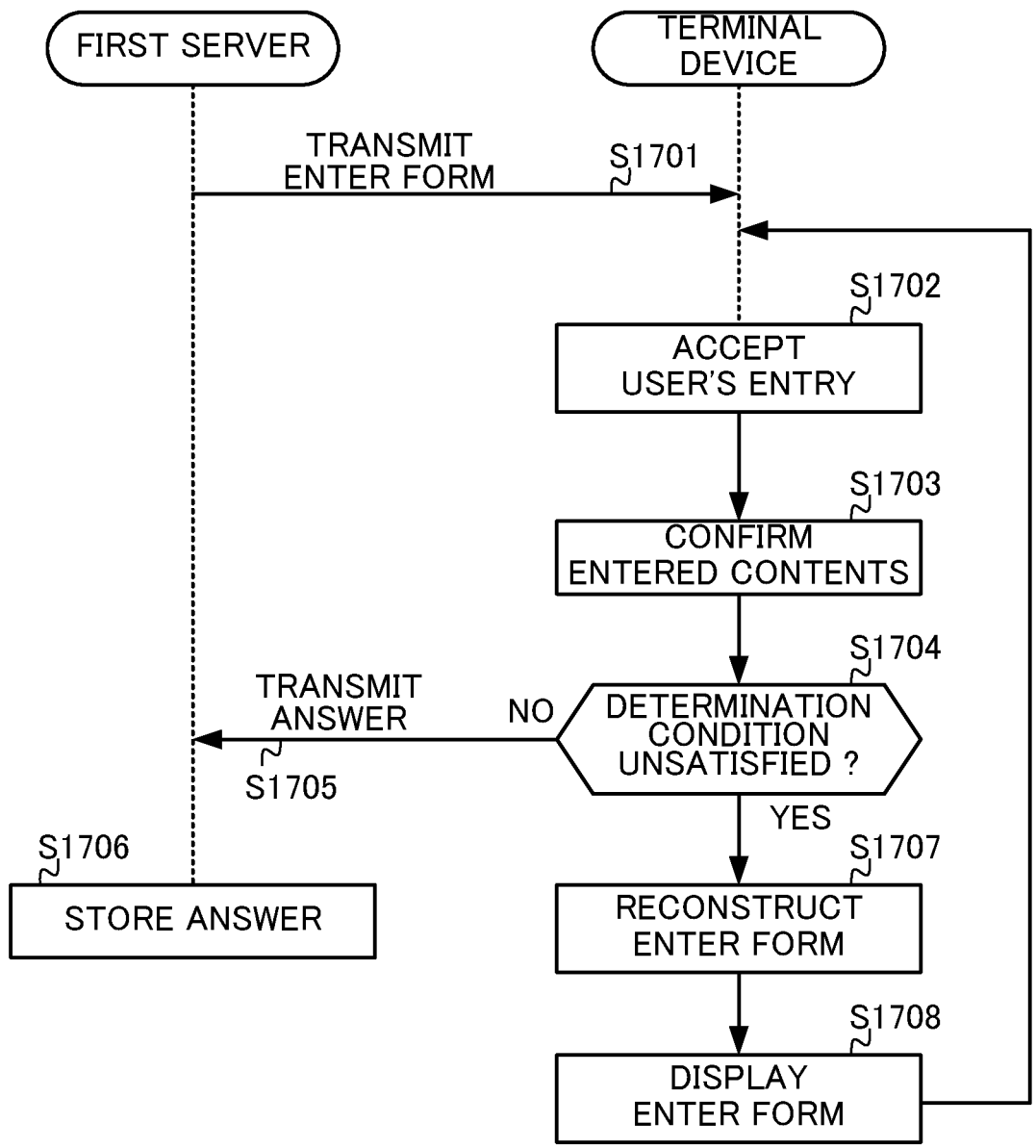
FIG. 17 illustrates a flowchart for explaining an enter accepting process.

FIG. 17 is a flowchart illustrating an accepting process of the answer to the questionnaire which is carried out by the first server 10 and the terminal device 30.

Initially, the controller 103 of the first server 10 transmits, to the terminal device 30, data constructing the enter form (step S1701).

The controller 306 of the terminal device 30 receives, from the first server 10, the data constructing the enter form, and displays the enter form on the display 351. The controller 306 accepts the user's entry (step S1702).

The user enters an answer in the answer field, and pushes the button 1415. Pushing of the button 1415 causes the controller 306 of the terminal device 30 to check the entered contents (step S1703). The controller 306 determines whether or not the answers are appropriately entered for all answer fields.

In this embodiment, the controller 306 determines, for each answer field, that the field satisfies the determination condition when any one of the radio buttons has been selected, and determines that the field fails to satisfy the determination condition when no radio button has been selected.

When determining that all fields satisfy the respective determination conditions (step S1704; NO), the controller 306 of the terminal device 30 transmits the entered answer to the first server 10 (step S1705). The controller 103 of the first server 10 receives the answer from the terminal device 30, and stores the received answer in the memory 101 (step S1706).

Conversely, when determining that at least any one of the fields fails to satisfy the determination condition (step S1704; YES), the controller 306 of the terminal device 30 reconstructs the enter form (step S1707), displays the enter form on the display 351 (step S1708), and accepts the entry from the user.

That is, the controller 306 lays out the answer field that has no radio button selected at the uppermost layer, and lays out, below this answer field, the rest of the answer fields. The answer field with no answer being entered by the user is laid out at the uppermost layer where the highest attention can be gotten from the user.

Subsequently, the controller 306 returns the process to the step S1702. The reconstruction of the enter form is repeated, and user's entries are accepted until all answer fields satisfy the respective determination conditions.

According to this embodiment, the user can quickly determine what item the user should enter or re-enter, although the number of services provided to the user is one, thereby improving the efficiency of the enter work.

In this embodiment, the two radio buttons are associated with a single answer field, but the number of associated radio buttons may be equal to or greater than three, or may be simply one.

Instead of the radio button, check boxes may be applied such that the user can simultaneously select two or more check boxes. When the number of checked answer fields is greater than the maximum number of simultaneous selection, the controller 306 may determine that the entered contents contain an error, and when the maximum number has not been exceeded, the controller may determine that there is nothing wrong with the entered contents.

Instead of the radio button, a text box may be employed which allows the user to enter optional texts. When the number of entered characters is equal to or greater than a predetermined number of characters, the controller 306 may determine that the entered contents contain an error, and when the number of entered characters is less than the predetermined number of characters, the controller may determine that there is nothing wrong with the entered contents.

Furthermore, each of the plurality of answer fields may be structured in different forms with, for example, the radio buttons, the check boxes, and the text box.

Third Embodiment

Next, the other embodiment will be described. In this embodiment, a screen for checking order details in the electronic shopping mall provided to the user by the first server 10 is reconstructed according to the order details. The second server 20 may be omitted.

Figure 18:
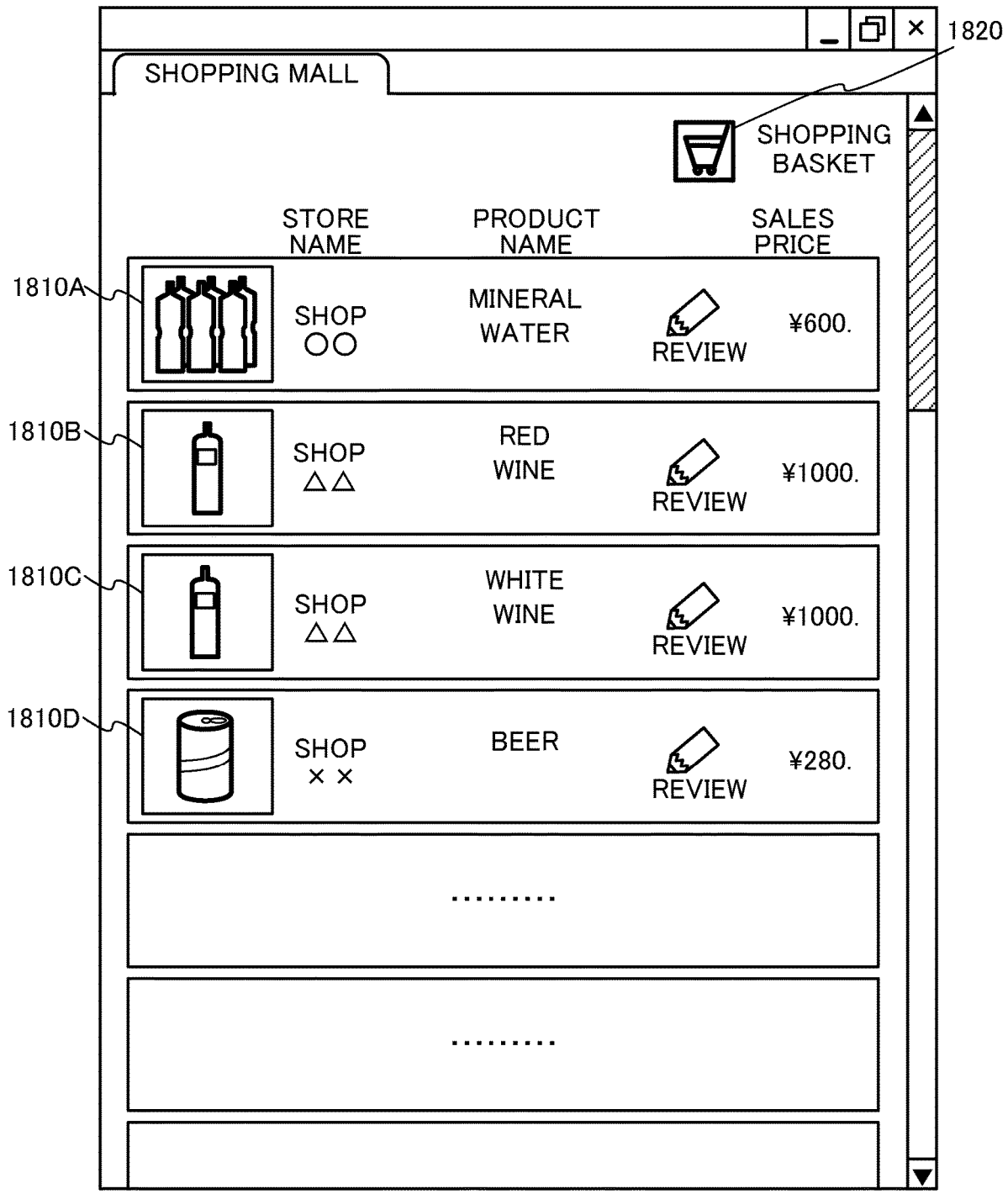
FIG. 18 is a diagram illustrating an example structure of a screen of an electronic shopping mall.

FIG. 18 illustrates an example display of a list of products that are for sale in the electronic shopping mall. Displayed on the display 351 are product information containing product images 1810 (in FIG. 18, four images 1810A, 1810B, 1810C, and 1810D), store names, product names, and respective sales prices, and a cart button 1820 for giving an instruction to display a purchase list (generally referred to as, a "cart" or a "shopping basket") that is registered by the user.

The product images 1810 are linked to respective webpages that display further detailed product information. When a display region of the image 1810 is clicked or touched by the user, the controller 306 of the terminal device 30 transfers the webpage to the webpage that displays the further detailed product information. Note that the display region of the image 1810 clicked or touched by the user is hereinafter simply described as, the image 1810 is selected, or the image 1810 is pushed.

Figure 19:
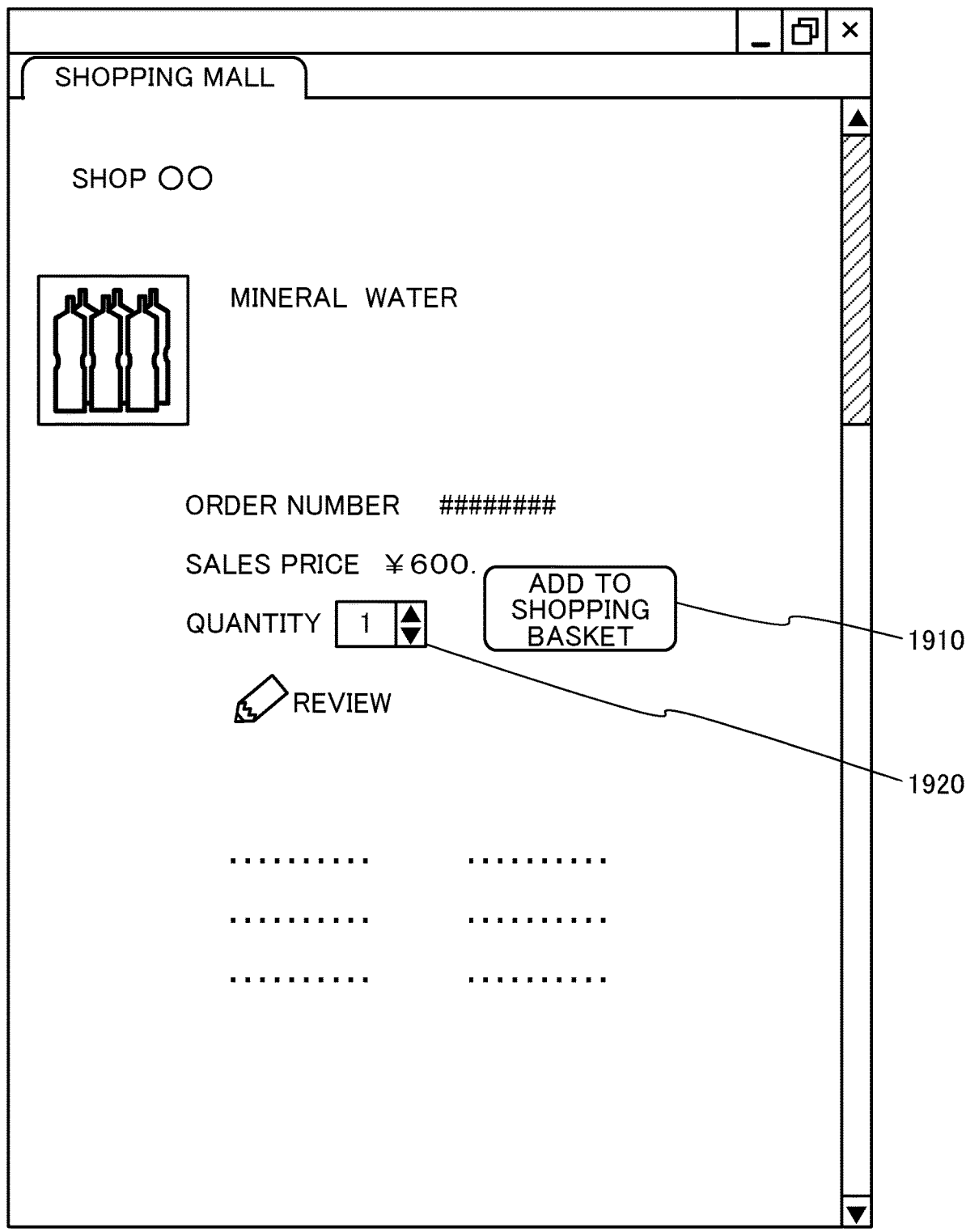
FIG. 19 is a diagram illustrating another example structure of a screen of the electronic shopping mall.

FIG. 19 illustrates a webpage for displaying the further detailed product information on the product corresponding to the image 1810A which is displayed after the image 1810A is selected.

When the purchase button 1910 is pushed, the controller 306 transmits, to the first server 10, an instruction to add the displayed product to the user's purchase list. The controller 103 of the first server 10 receives the instruction from the terminal device 30, and stores, in the memory 101, the purchase list in association with the user ID.

When a change button 1920 is pushed, the controller 306 changes an order quantity for the product.

Figure 20:
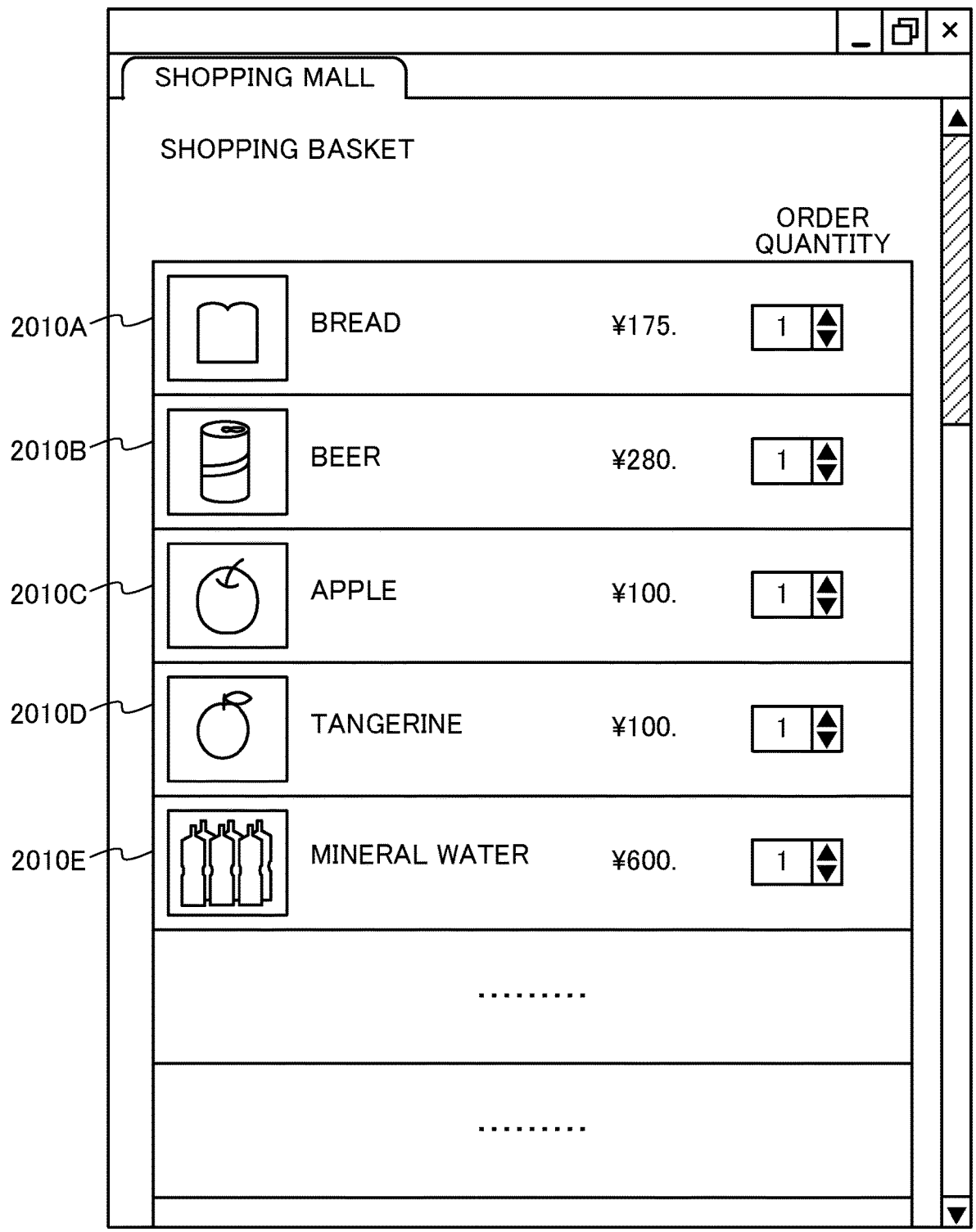
FIG. 20 is a diagram illustrating an example purchase list.

When the cart button 1820 is pushed in FIG. 18, the controller 306 obtains the purchase list from the first server 10, and as illustrated in FIG. 20, displays the purchase list. The purchase list contains the product information 2010 (in FIG. 20, five pieces of information, 2010A, 2010B, 2010C, 2010D, and 2010E) representing the product selected by the user.

FIG. 20 illustrates an example display of the purchase list when the order quantities for the respective products are all one. When the order quantities for the respective products are all one, the later the time at which the product is added to the purchase list is, the higher the display location of the product information set by the controller 306 becomes. That is, the product information representing the most recently added product is laid out at the uppermost layer.

In this embodiment, the controller 306 determines that the product information corresponding to the product that has the single order quantity only satisfies the determination condition, and determines that the product information corresponding to the product that has the order quantity of equal to or greater than two fails to satisfy the determination condition.

When a product that has multiple order quantities is contained in the purchase list, the controller 306 lays out the product information representing the product that has the multiple order quantities over the product information representing the product that has the single order quantity.

Figure 21:
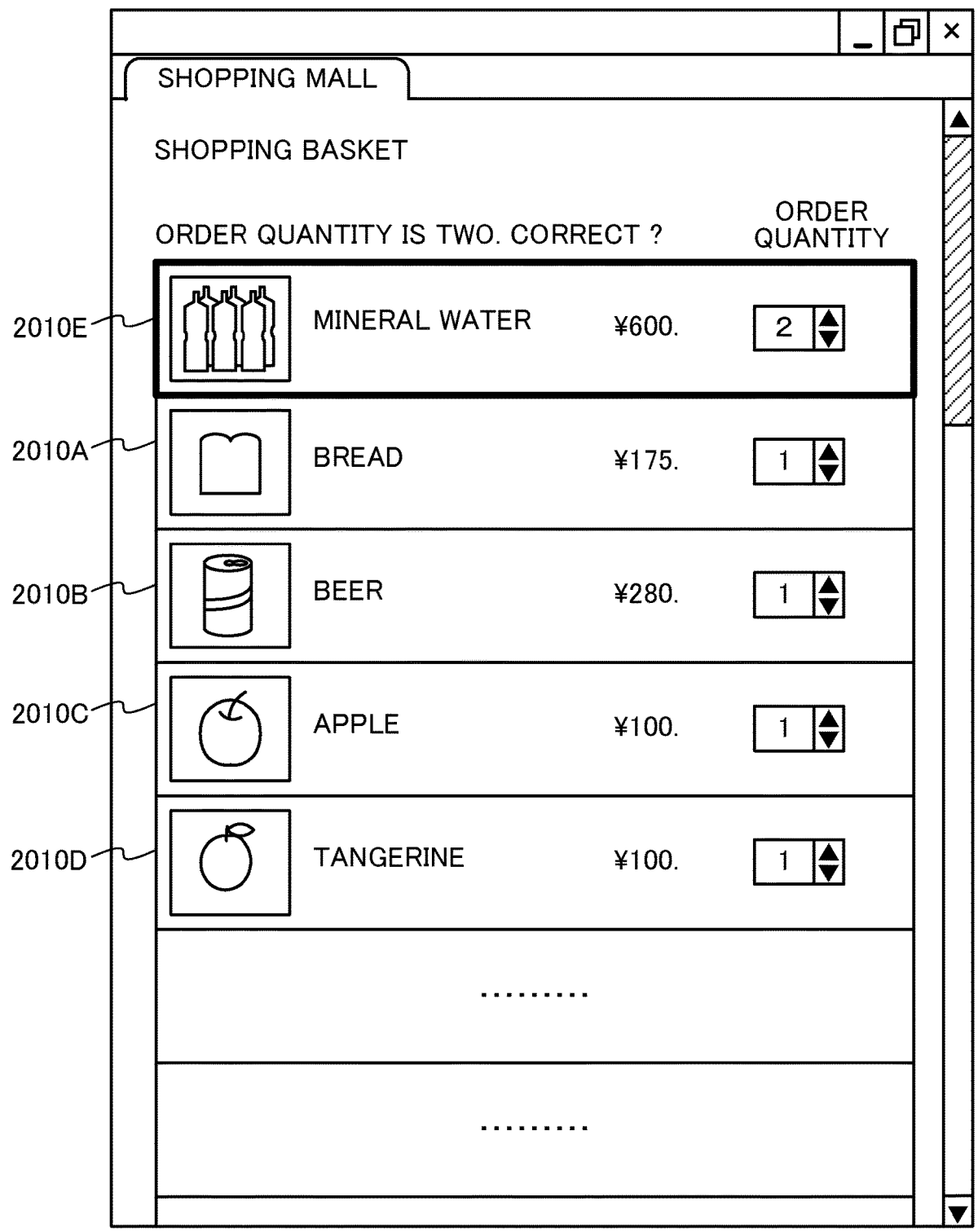
FIG. 21 is a diagram illustrating an example purchase list having the layout of product information modified.

FIG. 21 illustrates an example display of the purchase list when the purchase list contains the product that has the order quantity which is not one. In this case, the order quantity for a product "mineral water" is two. The controller 306 lays out the product information 2010E representing the product "mineral water" having the order quantity not one at the uppermost layer, and lays out, below this information, the rest of the pieces of product information, 2010A, 2010B, 2010C, and 2010D which have the single order quantity, respectively.

That is, the terminal device 30 lays out the product information representing the product having the order quantity that is not one at a location where the user's attention is relatively high, thereby prompting the user to confirm whether or not the order quantity is correct.

The controller 306 may display the product information representing the product having the order quantity not one in a relatively more emphasized manner to the rest of the pieces of product information. For example, the controller 306 may emphasize the product information of the product having the order quantity not one by changing the display color of the product information, enlarging the font size, blinking indication, addition of image, and the like.

Figure 22:
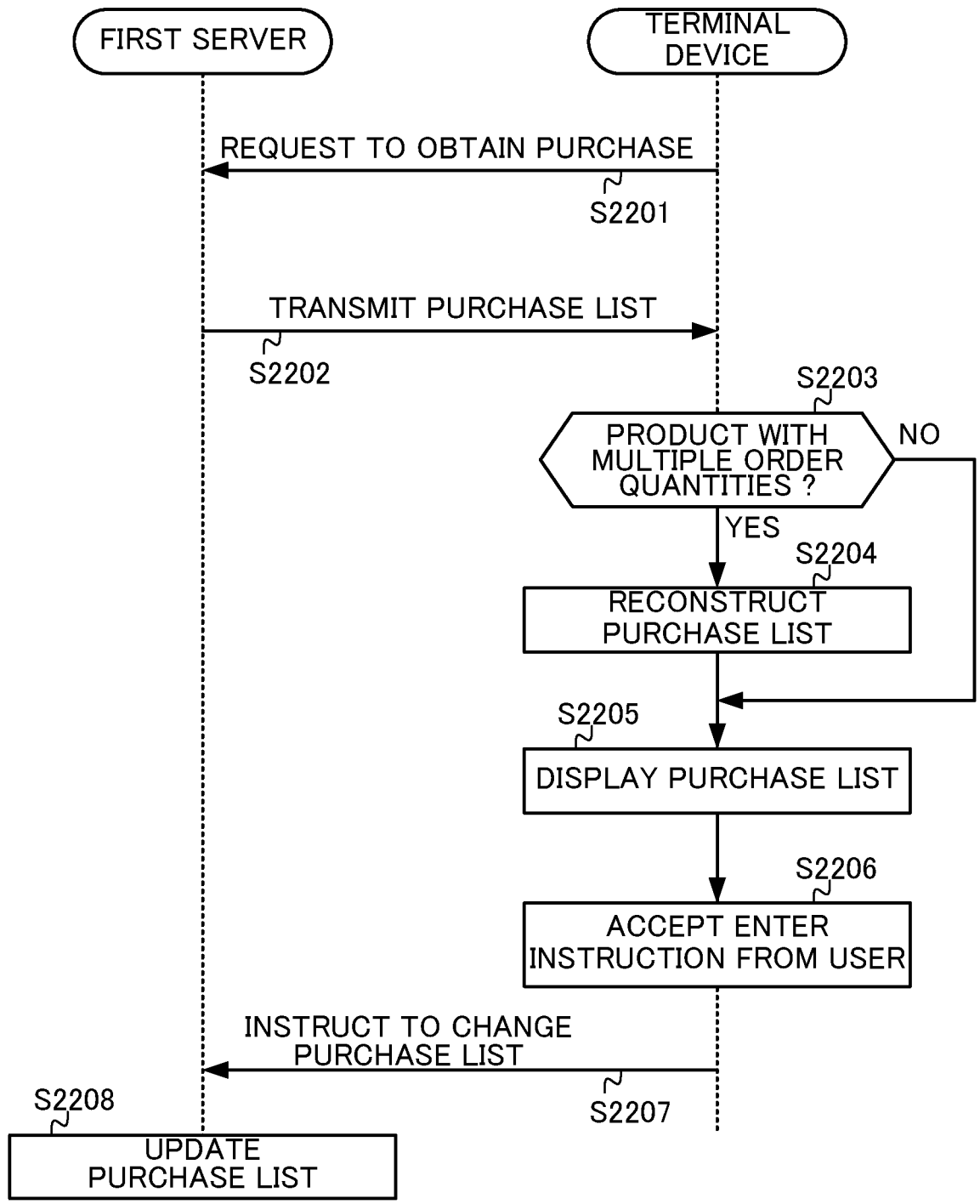
FIG. 22 is a flowchart for explaining a purchase list updating process.

FIG. 22 is a flowchart illustrating an updating process of the purchase list that is carried out by the first server 10 and the terminal device 30.

The user selects a product that the user desires to purchase, and adds the product to the purchase list through, for example, the screen illustrated in FIGS. 18, 19, and 20.

When the cart button 1820 as illustrated in FIG. 18 is pushed, the controller 306 of the terminal device 30 transmits the user ID to the first server 10, and requests the obtainment of the latest purchase list from the first server 10 (step S2201).

The controller 103 of the first server 10 obtains the purchase list from the memory 101, and transmits the obtained purchase list to the terminal device 30 (step S2202). The controller 306 of the terminal device 30 displays the obtained purchase list on the display 351.

Note that the purchase list obtained by the terminal device 30 in this case contains at least identification information that identifies the product, and the order quantity for the product.

The controller 306 of the terminal device 30 determines whether or not the product information contained in the obtained purchase list satisfies the determination condition, that is, whether or not the obtained purchase list contains the product having the multiple order quantities (step S2203).

When the product having the multiple order quantities is not contained (step S2203; NO), the process advances to step S2205. When the product having multiple order quantities is contained (step S2203; YES), the controller 306 reconstructs the purchase list (step S2204), and displays the reconstructed purchase list on the display 351 (step S2205).

That is, as illustrated in FIG. 21, the controller 306 lays out the product information corresponding to the product having the multiple order quantities at the uppermost layer, and lays out, under this product information, the product information corresponding to the products that have the single order quantity.

When there are more than one products having the multiple order quantities, the later the time at which the product is added to the purchase list is, the higher the layer where the controller 306 lays out the product information corresponding to the product having the multiple order quantities is.

The user views the reconstructed purchase list, and confirms whether or not the order quantity contains an error. The product information corresponding to the product having multiple order quantities is laid out at the location where the user can get higher attention, and thus the user can easily check the order quantity. The user can easily confirm whether or not there is any error in the order details as the user views the reconstructed purchase list.

The controller 306 of the terminal device 30 accepts an enter instruction from the user (step S2206). The enter instruction accepted in this case is, for example, the enter instruction to change the purchase list, or the enter instruction to make a purchase based on the purchase list.

When accepting the enter instruction to make a purchase based on the purchase list, the controller 306 of the terminal device 30 notifies the first server 10 of the purchase that is made based on the purchase list. Subsequently, a payment process for making a payment for the purchase is executed by the terminal device 30 and the first server 10.

When accepting the enter instruction to change the purchase list, the controller 306 of the terminal device 30 instructs the first server 10 to change the purchase list based on the user's entry (step S2207). For example, the controller 306 accepts the enter instruction to change the order quantity, and instructs the first server 10 to change the order quantity.

The controller 103 of the first server 10 updates the purchase list stored in the memory 101 (step S2208).

According to this embodiment, the user can easily determine whether or not there is an error entering, thus reducing an order error.

The present disclosure is not limited to the aforementioned embodiments, and various modifications and applications can be made. In addition, elements of the aforementioned embodiments can be freely combined.

The contents entered in the enter form may be checked by the first server 10 (or the second server 20) or by the terminal device 30.

The reconstruction of the enter form may be performed by the first server 10 (or the second server 20) or by the terminal device 30.

For example, in the first embodiment, a simplified check as to whether or not, for example, at least a single character is entered in each of the fields 601 to 605 may be performed by the terminal device 30, and a more sophisticated check as to whether or not, for example, the user ID is consistent with other user ID may be performed by the first server 10 (or the second server 20).

In the first embodiment, the enter form may contain the radio buttons or check boxes instead of the fields 601 to 605 for accepting the characters entered by the user or in addition to these fields 601 to 605.

In addition to the text box, the "field" of the aforementioned embodiments includes objects, such as the radio button, the check box, a list box, a drop down list, and a combo box.

In the first embodiment, the first server 10 may provide both first service and second service to the terminal device 30. In this case, the memory 101 of the first server 10 stores both of the first database 151 and the second database 251. In addition, the controller 103 of the first server 10 provides, to the terminal device 30, the first service based on the user information stored in the first database 151, and also provides, to the terminal device 30, the second service based on the user information stored in the second database 251. The second server 20 can be omitted in this case.

According to the present disclosure, there are provided the information processing system, the information processing device, the information processing method, the non-transitory recording medium, and the program suitable for presenting, to the user, the item that is to direct the user's attention in an easy-to-understand manner when the user enters in multiple items.

REFERENCE SIGNS LIST

1 Information processing system
2 Display controlling unit
3 Accepting unit
4 Determining unit
5 Obtaining unit
6 Inputting unit
10 First server
20 Second server
30 Terminal device
50 Communication network
101 Memory
102 Communicator
103 Controller
151 First database
201 Memory
202 Communicator
203 Controller
251 Second database
301 Communicator
302 Image processor
303 Sound processor
304 Input I/F
305 Memory
306 Controller
351 Display
252 Speaker

The invention claimed is:

1. An information processing system comprising:
at least one memory operable to store program code; and
at least one processor operable to read the program code and operate as instructed by the program code, the program code including:
receiving code configured to cause the at least one processor to receive a request containing user identification information from a terminal device;
accepting code configured to cause the at least one processor to accept a first entry in a plurality of fields in a first form, wherein the first entry includes one or more entries in the plurality of fields in the first form, wherein the first entry in the plurality of fields in the first form is automatically entered based on user information from an external server, wherein the user information is associated with the user identification information;
determining code configured to cause the at least one processor to determine, after receiving an input from a user associated with finishing the first entry in the plurality of fields in the first form, whether each of the plurality of entered fields in the first form satisfies a determination condition that is associated in advance with each of the plurality of fields in the first form; and
display controlling code configured to cause the at least one processor to: (i) generate a second form in which an unsatisfied field is arranged above a satisfied field satisfying the determination condition among the plurality of entered fields in the first form, wherein the unsatisfied field fails to satisfy the determination condition among the plurality of entered fields in the first form, and (ii) display on the terminal device, the second form, wherein the accepting code is further configured to cause the at least one processor to accept, from the user, a second entry in a plurality of fields in the second form, wherein the unsatisfied field is arranged above the satisfied field and set to be blank in the second form, wherein the unsatisfied field is displayed within a viewable region without scrolling through a page including the second form, the viewable region being an above-the-fold region of the page, wherein the display controlling code is further configured to cause the at least one processor to (i) display the first form in which the plurality of entered fields are arranged in a vertical direction, and (ii) generate the second form in which the unsatisfied field is arranged at a top position of the second form.

2. The information processing system according to claim 1, wherein the determining code is further configured to cause the at least one processor to determine that, for each of the plurality of fields in the first form, a first field of the plurality of fields satisfies the determination condition when information is entered into the first field of the plurality of fields by the user, and determine that a second field of the plurality of fields fails to satisfy the determination condition when the information is not entered into the second field of the plurality of fields by the user.

3. The information processing system according to claim 1, wherein:
the information processing system further provides, to the user, an electronic commerce service for accepting, from the user, an instruction to purchase a product;
the first form includes a plurality of product information, each of the plurality of product information associated with a first field indicating a product to be purchased by the user and a second field indicating a number of products to be purchased by the user; and
the determining code is further configured to cause the at least one processor to, based on determining that the number of products to be purchased by the user is more than one, determine that the second field fails to satisfy the determination condition.

4. The information processing system according to claim 1, wherein the display controlling code is further configured to cause the at least one processor to display the unsatisfied field in a relatively emphasized manner, and
wherein the relatively emphasized manner comprises changing a display color of a product information, changing a display color of the one or more of the plurality of fields, enlarging a font size, blinking indication, and adding an image.

5. The information processing system according to claim 1, wherein the second form is not displayed when the first form is displayed.

6. An information processing system comprising:
a first server associated with a first service;
a second server associated with a second service, the second server configured to receive user information from the first server, wherein the user information includes user identification information and the user identification information is received from a terminal device in a request; and the terminal device configured to:
receive, from the second server, a first form including a plurality of fields;
accept a first entry in the plurality of fields in the first form for the second service, wherein the first entry in the plurality of fields in the first form is automatically entered based on the user information from the first server, wherein the first entry includes one or more entries in the plurality of fields in the first form;
determine, after receiving an input from a user associated with finishing the first entry in the plurality of fields in the first form, whether the first entry in the plurality of fields satisfies a determination condition that is associated in advance with each of the plurality of fields in the first form,
setting an unsatisfied field that fails to satisfy the determination condition to be blank, and generating a second form in which the unsatisfied field is arranged above a satisfied field satisfying the determination condition; and
displaying the second form on the terminal device, and accepting a second entry, from the user, in a plurality of fields in the second form,
wherein the unsatisfied field is displayed within a viewable region without scrolling through a page including the second form, the viewable region being an above-the-fold region of the page, and
wherein (i) the plurality of entered fields in the first form are arranged in a vertical direction, and (ii) the unsatisfied field in the second form is arranged at a top position of the second form, wherein the unsatisfied field fails to satisfy the determination condition among the plurality of entered fields in the first form.

7. The information processing system according to claim 6, wherein, based on the plurality of fields in the first form being determined to not satisfy the determination condition, set the at least one of the plurality of fields to be blank in the second form.

8. An information processing method comprising:
receiving a request containing user identification information from a terminal device;
accepting a first entry in a plurality of fields in a first form, wherein the first entry in the plurality of fields in the first form is automatically entered based on user information from an external server, wherein the user information is associated with the user identification information, and wherein the first entry includes one or more entries in the plurality of fields in the first form;
determining, after receiving an input from a user associated with finishing the first entry in the plurality of fields in the first form, whether each of the plurality of entered fields in the first form satisfies a determination condition that is associated in advance with each of the plurality of fields in the first form; and
displaying, (i) generating a second form in which an unsatisfied field is arranged above a satisfied field satisfying the determination condition among the plurality of entered fields in the first form, wherein the unsatisfied field fails to satisfy the determination condition among the plurality of entered fields in the first form, (ii) displaying, on the terminal device, the second form, and (iii) accepting, from the user, a second entry in a plurality of fields in the second form,
wherein the unsatisfied field arranged above the satisfied field is set to be blank in the second form,
wherein the unsatisfied field is displayed within a viewable region without scrolling through a page including the second form, the viewable region being an above-the-fold region of the page, and wherein (i) the plurality of entered fields in the first form are arranged in a vertical direction, and (ii) the unsatisfied field in the second form is arranged at a top position of the second form.

9. The information processing method according to claim 8, wherein the method further comprises determining that, for each of the plurality of fields in the first form, a first field of the plurality of fields satisfies the determination condition when information is entered into the first field of the plurality of fields by the user, and determining that a second field of the plurality of fields fails to satisfy the determination condition when the information is not entered into the second field of the plurality of fields by the user.

10. The information processing method according to claim 8, further comprising:

providing, to the user, an electronic commerce service for accepting, from the user, an instruction to purchase a product;

providing the first form including a plurality of product information, each of the plurality of product information associated with a first field indicating a product purchased by the user and a second field indicating a number of products purchased by the user; and the determining further comprising, based on determining that the number of products to be purchased by the user is more than one, determining that the second field fails to satisfy the determination condition.

11. The information processing method according to claim 8, wherein the displaying further comprises displaying the unsatisfied field in a relatively emphasized manner, and wherein the relatively emphasized manner comprises changing a display color of a product information, changing a display color of the one or more of the plurality of fields, enlarging a font size, blinking indication, and adding an image.

12. A non-transitory computer readable recording medium having stored therein a program for causing a computer to:

receive a request containing user identification information from a terminal device;

accept a first entry in a plurality of fields in a first form, wherein the first entry in the plurality of fields in the first form is automatically entered based on user information from an external server, wherein the user information is associated with the user identification information, and wherein the first entry includes one or more entries in the plurality of fields in the first form;

determine, after receiving an input from a user associated with finishing the first entry in the plurality of fields in the first form, whether each of the plurality of entered fields in the first form satisfies a determination condition that is associated in advance with each of the plurality of fields in the first form; and display, (i) generate a second form in which an unsatisfied field is arranged above a satisfied field satisfying the determination condition among the plurality of entered fields in the first form, wherein the unsatisfied field fails to satisfy the determination condition among the plurality of entered fields in the first form, (ii) display, on the terminal device, the second form, and (iii) accept, from the user, a second entry in a plurality of fields in the second form, wherein the unsatisfied field arranged above the satisfied field is set to be blank in the second form, wherein the unsatisfied field is displayed within a viewable region without scrolling through a page including the second form, the viewable region being an above-the-fold region of the page, and wherein (i) the plurality of entered fields in the first form are arranged in a vertical direction, and (ii) the unsatisfied field in the second form is arranged at a top position of the second form.

13. The non-transitory computer readable recording medium according to claim 12, wherein the program further causes the computer to:

determine that, for each of the plurality of fields in the first form, a first field of the plurality of fields satisfies the determination condition when information is entered into the first field of the plurality of fields by the user, and determine that a second field of the plurality of fields fails to satisfy the determination condition when the information is not entered into the second field of the plurality of fields by the user.

14. The non-transitory computer readable recording medium according to claim 12, wherein the program further causes the computer to:

provide, to the user, an electronic commerce service for accepting, from the user, an instruction to purchase a product;

provide the first form including a plurality of product information, each of the plurality of product information associated with a first field indicating a product to be purchased by the user and a second field indicating a number of products to be purchased by the user; and based on determining that the number of products to be purchased by the user is more than one, determine that the second field fails to satisfy the determination condition.

15. The non-transitory computer readable recording medium according to claim 12, wherein the program further causes the computer to display the unsatisfied field in a relatively emphasized manner, and wherein the relatively emphasized manner comprises changing a display color of a product information, changing a display color of the one or more of the plurality of fields, enlarging a font size, blinking indication, and adding an image.

* * * * *